United States Patent [19]

Belcher

[11] Patent Number: 4,988,279

[45] Date of Patent: Jan. 29, 1991

[54] APPARATUS FOR EXTRUSION BLOW MOLDING POLYETHYLENE TEREPHTHALATE ARTICLES

[75] Inventor: Samuel L. Belcher, Cincinnati, Ohio

[73] Assignee: Sabel Plastechs, Inc., Cincinnati, Ohio

[21] Appl. No.: 235,237

[22] Filed: Aug. 23, 1988

[51] Int. Cl.⁵ .................. B29C 49/04; B29C 49/34
[52] U.S. Cl. ................... 425/525; 264/540; 425/526; 425/529; 425/532; 425/539
[58] Field of Search ............ 425/532, 539, 526, 529, 425/530, 525, 527, 208, 500; 264/540, 542, 529, 530, 209.4, 209.5

[56] References Cited

U.S. PATENT DOCUMENTS

| | | | |
|---|---|---|---|
| 2,951,264 | 9/1960 | Bailey | 264/532 |
| 2,967,330 | 1/1961 | Tommarchi | 264/540 |
| 3,020,595 | 2/1962 | Szajna | 249/79 |
| 3,814,563 | 6/1974 | Slaby et al. | 425/208 X |
| 3,821,349 | 6/1974 | Mozer | 264/209.4 |
| 4,070,429 | 1/1978 | Uhlig | 425/530 X |
| 4,159,889 | 7/1979 | Yagi et al. | 264/209.4 x |
| 4,188,357 | 2/1980 | Go | 264/540 |
| 4,307,060 | 12/1981 | Go | 264/540 |
| 4,381,183 | 4/1983 | Bowers et al. | 425/527 X |
| 4,424,178 | 1/1984 | Daubenbuchel | 425/532 X |
| 4,477,408 | 10/1984 | Michl | 425/529 X |
| 4,611,981 | 9/1986 | English | 425/529 |
| 4,746,283 | 5/1988 | Hobson | 425/532 X |
| 4,758,144 | 7/1988 | Becker | 425/532 X |

Primary Examiner—Richard L. Chiesa
Attorney, Agent, or Firm—Wood, Herron & Evans

[57] ABSTRACT

The present invention is directed to an apparatus for extrusion blow molding polyethylene terephthalate articles. Articles produced according to this invention may be monolayer or multilayer; they may be circumferentially or biaxially oriented; and they may be heat set.

41 Claims, 7 Drawing Sheets

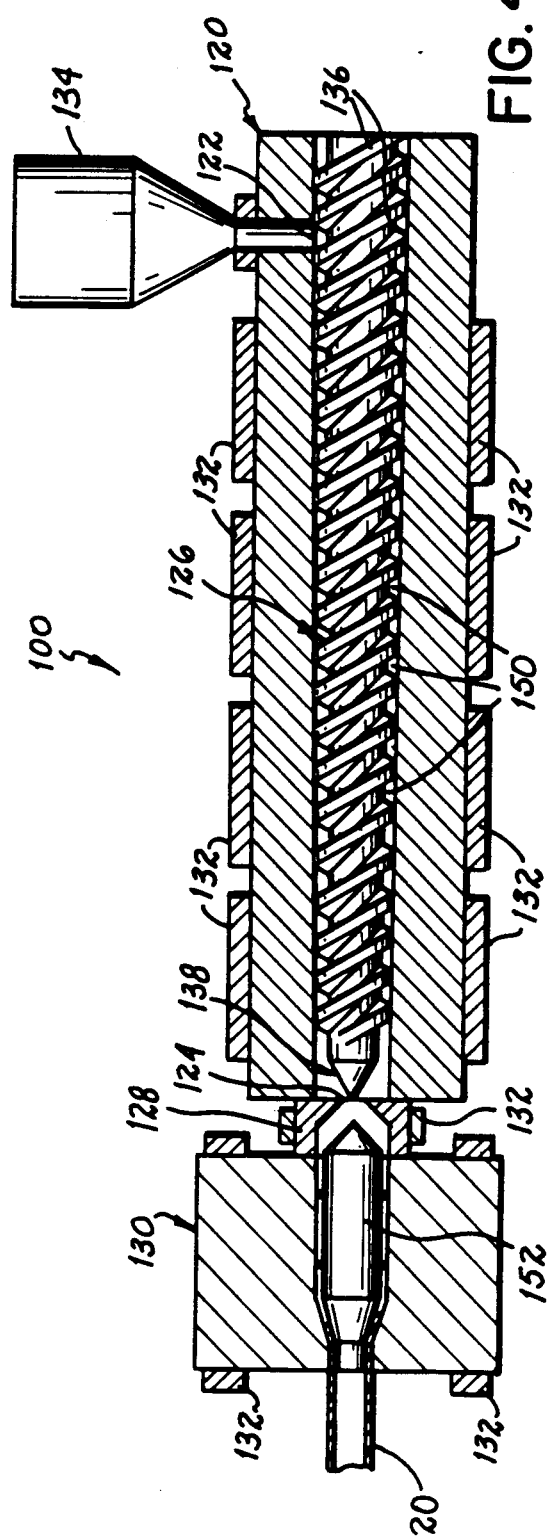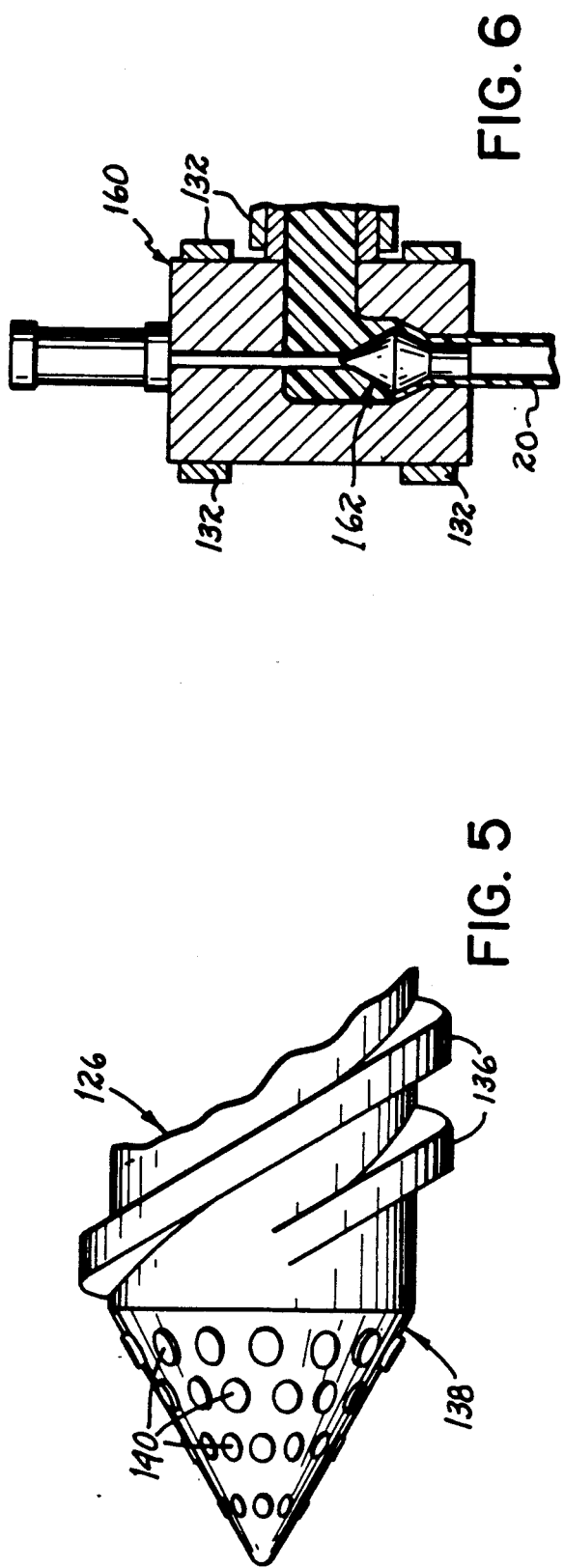

APPARATUS FOR EXTRUSION BLOW MOLDING POLYETHYLENE TEREPHTHALATE ARTICLES

Background of the Invention

The present invention is directed to a method and apparatus for extrusion blow molding thermoplastic articles, and more particularly to a method and apparatus for extrusion blow molding circumferentially or biaxially oriented monolayer and multilayer polyethylene terephthalate articles.

Currently, blow molded thermoplastic containers of polyethylene terephthalate (PET) are primarily made in one of two ways: two stage injection stretch blow molding or single stage injection stretch blow molding. Known injection stretch blow molding processes generally fit into one of two categories. In the first type of process, a preform is injection molded and then allowed to cool to room temperature. The preform is then stored or sent immediately to a blow molding station where the formed preform is blown to the shape of the desired article. Prior to blow molding, however, the preform has to be heated up to its blow molding temperature. This type of process is disadvantageous in that it is highly energy intensive.

In the second type of injection stretch blow molding process the preform is injection molded and passed, while it is still in a heated condition, to a blow station where it is blown. This type of process requires considerably less energy than the first type of process, however, both processes are disadvantageous in that production is inherently limited because the injection molding step is intermittent. That is, the molten thermoplastic is injected as a "shot" into the preform mold, which is not a continuous operation. Another disadvantage of injection blow molding is the high cost of tooling for the die head and preform mold. A new die and preform mold are required for each different shaped article produced because the preform from which the desired article is blown must meet very specific dimensional requirements in order to form the desired article when blown.

Another commonly used method for producing thermoplastic articles, but not PET articles, is extrusion blow molding. In this type of process the thermoplastic material is continuously extruded in hollow tube form, segments of the pipe are enclosed in a blow mold and the desired article is blown. One material commonly used in such a process is a copolymer of ethylene terephthalate and diethylene glycol, referred to as PETG. This and other copolymers which are capable of being extrusion blow molded oftentimes have limited use due to the fact that they have insufficient moisture impermeability or may not pass migration tests.

Polyethylene terephthalate (PET) resins are excellent molding compounds for making hollow articles such as beverage containers and the like. PET possesses good impact strength and can be formed into clear or colored articles, as desired. In addition, PET has good fatigue resistance and therefore its uses include applications where the product is subjected to fatigue inducing conditions, such as squeeze bottles. It is known to make various PET containers by the injection molding processes described above, however, such processes have the attendant disadvantages mentioned. Additionally, it is known to extrude PET in the form of a pipe and immediately cool the PET pipe below its glass transition temperature (Tg) subsequent to extrusion. The PET pipe is then cut into predetermined tube lengths which can be stored or formed into preforms; in the latter instance, the tubes are heated at both ends and the closed end and finish (threaded area) are formed therein using one of various known methods. The preforms are then heated and blown using known blow molding techniques. Methods such as that described, however, are disadvantageous in that they require several extra steps for fabricating the final product. That is, cooling the pipe, cutting the pipe into predetermined lengths and reheating to form the closed end and finish portions.

In the molten state, and especially at temperatures above about 520° F., PET behaves as a Newtonian fluid; that is, the rate of shear is directly proportional to the shearing force. As a consequence, molten PET has poor melt strength. It has thus heretofore been thought, and recognized in the prior art, U.S. Pat. Nos. 4,188,357 and 4,307,060, that PET containers could not successfully be produced enclosing the tube in a blow mold and blowing the article. The rationale for this is that at the temperature necessary for extrusion as a tube, PET will not maintain its tubular shape long enough to enclose the tube in a blow mold because of its poor melt strength.

What is needed is a method and apparatus whereby circumferentially or biaxially oriented polyethylene terephthalate articles are formed continuously by extrusion blow molding.

Summary of the Invention

The present invention is directed to a method and apparatus for extrusion blow molding polyethylene terephthalate articles. Articles produced according to the practice of a preferred embodiment of the disclosed method and apparatus are monolayer PET and can be either circumferentially or biaxially oriented. These articles are formed by enclosing segments of a monolayer tube of PET, which has been extruded from a single screw extruder, in one mold of a set of traveling blow molds and blowing the articles, as will be described more fully herein. In another preferred embodiment, the articles produced are multilayer and can be either circumferentially or biaxially oriented. These articles are formed by enclosing segments of a multilayer tube, which has been co-extruded from a plurality of extruders (each extruder extruding one component layer of the multilayer tube), in one mold of a set of traveling blow molds and blowing the desired articles, as will be described more fully herein. Both the above-mentioned embodiments require at least one single-screw extruder that is specially adapted to continuously extrude PET in the form of a hollow tube such that the PET has sufficient hot melt strength to be subsequently blow molded.

A preferred extruder comprises a barrel having an input and an output opening, an extrusion screw disposed within the barrel, a die adapter attached to the barrel at the output end, a die head attached to the die adapter and a plurality of heater bands for heating the barrel, die adapter and die head, which in turn heat the PET. The input opening in the barrel, which may be fitted with a hopper, is used for charging the extruder with PET pellets. While any suitable PET pellets may be used in the disclosed method and apparatus, the following are listed as suitable examples: Eastman's 7352, 9663, 9921 and 9899; ICI's 5122c and 5822c;

Goodyear's 7207 and 8006; and American Hoechst's T-95.

The design and operation of the PET extruder are critically important in the practice of the present invention and several competing factors must be considered. The first factor to consider is increasing the hot melt strength of the molten PET so that it is stable enough to be extruded as a hollow tube without collapsing. The melt strength of PET increases as its temperature is decreased because melt strength is directly related to fluid viscosity which is inversely temperature dependent. That is, as the temperature decreases the viscosity increases, and thus the melt strength increases. Therefore, the required melt strength for the PET extrudate is achieved by lowering the temperature of the extrudate. It has been advantageously determined that the PET extrudate temperature should preferably be between about 490° F. and about 520° F. in order for the extrudate to have sufficient melt strength so the extruded hollow tube will not collapse.

A second factor to consider is the need to have a clear, homogenous extrudate that is completely free of "non melt." That is, PET pellets which have not been completely broken down — analogous to partially melted ice cubes in water. "Non melt" is alleviated by increasing the temperature of the PET in the extruder and increasing the shear energy imparted to the pellets in the extruder to completely breakdown the pellets. A final factor to consider is that heat degradation of PET occurs at or about 560° F., which therefore serves as the upper temperature limit in the extruder.

The PET extruder which forms an integral part of the apparatus of this invention is designed to accommodate all the above-mentioned factors. The heater bands on the extruder barrel, die adapter and die head create a reverse temperature gradient in the extruder such that the PET pellets are initially heated to a temperature slightly below their heat degradation point while they are being worked in the barrel by the extrusion screw. The temperature of the PET is then generally decreased as it travels along the extruder from the input opening to the output opening, through the die adapter and out the die head so that the hollow tube of PET is extruded at a temperature of between about 490° F. and about 520° F. In this temperature range, the PET tube is sufficiently stable (that is, it has sufficient hot melt strength) that it will not collapse.

The reverse temperature gradient in the extruder creates a corresponding viscosity gradient in the PET because the relatively cooler PET at the output end flows less freely than that in the barrel. This viscosity gradient creates a back pressure in the extruder barrel which in turn increases the shear energy imparted to the PET by the extrusion screw. In addition to the increased shear caused by the back pressure, the extrusion screw is designed so the gap between the flights on the screw and the inside wall of the barrel are smaller than those in a typical PET injection molding extruder. The smaller gap serves to further increase the shear in the PET because of the more restrictive flow path. The screw may also be provided with a plurality of lugs on its tip, which is at the end adjacent the output opening of the extruder barrel. The lugs serve the dual function of aiding in mixing the molten PET and further increasing the shear in the PET by disrupting the relatively smooth flow which exists in smooth-tipped extrusion screws.

The shear energy imparted to the PET, which is due to the lugs, the flight/barrel spacing and the viscosity gradient-induced back pressure, together with heating the PET to a maximum temperature of between about 535° F. and about 560° F., effects the complete breakdown of the PET pellets. The result is clear, homogenous, molten PET. Using the heater bands, the temperature of the molten PET is lowered so that at the point of extrusion from the die head it is between about 490° F. and 520° F. The particular temperature of the extrudate depends upon the diameter and wall thickness of the extruded tube. The die head preferably includes a means for adjusting the wall thickness of the extruded tube so that various sized and shaped articles can be produced without changing die heads.

A preferred apparatus of this invention, for producing circumferentially oriented monolayer PET articles, includes a PET extruder of the type hereinabove described. The apparatus may further include a vacuum box with cooling means, which, for example, may be water cooling, and heater means arranged in series, through which the extruded PET tube passes immediately subsequent to extrusion. After passing through the vacuum box with cooling means and heater means, segments of the tube are continuously enclosed by molds in a set of traveling blow molds and the desired articles are blown. In an alternative embodiment, there is no vacuum box or heater means and the tube is taken up by the traveling blow molds immediately after extrusion.

In the embodiment including a vacuum box with cooling means and heater means, the extruded PET tube first passes through the vacuum box with cooling means, which ensures the integrity of the tube by conforming it to a desired tubular standard and lowers its temperature below the glass transition temperature, Tg, of PET, which is approximately 155° F.–160° F. The tube then passes through a heater, which may be of any suitable variety, but is preferably an RF quartz heater or any IR-type heater. The heater conditions the tube so that it is within the stretch orientation temperature range of PET — that is, between about 95° F. and about 240° F. Alternatively, the PET tube may pass through a vacuum box and cooling means and emerge at a temperature in the stretch orientation temperature range of PET, in which case no conditioning heater is used.

The PET tube, after it has passed through the vacuum box and heater, or immediately after it has been extruded and passed through a vacuum box or sizing die, is taken up in a series of traveling blow molds for blow molding. In a preferred apparatus, a set of two or more clam shell-type blow molds are supported by a support structure adjacent the extruder or heater. The molds are movably supported by rods and means such as a hydraulic cylinder facilitates the oscillation of the molds along a longitudinal path which is colinear with the extruded tube. The molds alternatingly face in opposite directions transverse their direction of motion such that as one mold closes around the extruded tube and moves in a direction away from the die head, an adjacent mold moves in a direction toward the die head in the open position and the two molds pass without interfering with one another. Traveling molds of this type are known in the art.

In one embodiment of the present invention, the two or more traveling molds, which are standard needle-blow molds, oscillate along the support structure at substantially the same speed as the extruded pipe. The molds are operated at a temperature of between about 32° F. and about 60° F., while the tube temperature is in the stretch orientation temperature range of PET. The tube segment enclosed in each mold is blown to form the desired article, which is circumferentially oriented only, however, because the tube is not stretched longitudinally prior to blow molding to provide axial orientation.

In an alternative embodiment, subsequent to enclosing the tube segments in the blow molds and prior to blowing the desired articles, tube segments are stretched up to 2.5 times their length by stretching means associated with the molds. The stretched tube segments are then blown into the desired articles, which are biaxially oriented due to the longitudinal stretching and blowing.

A further alternative embodiment, which may include a vacuum box with cooling means and heater means, and which may also include blow molds having tube stretching means, has two sets of traveling blow molds. The molds in the first set operate in precisely the same manner as those previously described with the exception that they are above the glass transition temperature of PET when the articles are blown. After release from the first set of molds, the blown articles are enclosed in a second set of molds and blown again. The molds in this second set are operated at between about 32° F. and about 60° F., which is relatively cold as compared to the first set. The second set of molds oscillate along the support structure, as do the molds in the first set, however, there is no overlap between sets. Thus, a segment of the hollow tube is enclosed in a mold from the first set and the desired article is blown as the mold travels longitudinally away from the die head. After the blown article is released from the mold from the first set, it is enclosed in a mold from the second set and blown again as that mold travels further longitudinally away from the die head. This double blowing operation, first at a relatively high temperature and then at a relatively low temperature, "heat sets" the blown articles and increases their crystallinity to between about 30% to 43%, which increases the barrier properties of the final articles.

As hereinabove disclosed, the present invention contemplates the following apparatus combinations for producing circumferentially and biaxially oriented monolayer PET articles: (1) PET extruder as described and one set of traveling blow molds operated between about 32° F. and 60° F.; (2) PET extruder and one set of traveling blow molds operated between about 32° F. and 60° F. and providing longitudinal stretching of a PET tube segment of up to 2.5 times its length prior to blowing; (3) PET extruder and two sets of traveling blow molds to provide "heat setting"; (4) PET extruder and two sets of traveling blow molds to provide "heat setting" wherein the first set of molds provides longitudinal stretching of a PET tube segment of up to 2.5 times its length prior to blowing; (5) PET extruder, vacuum box and one set of traveling blow molds operated between about 32° F. and 60° F.; (6) PET extruder, vacuum box, and one set of traveling blow molds operated between about 32° F. and 60° F. and providing longitudinal stretching of a PET tube segment of up to 2.5 times its length prior to blowing; (7) PET extruder, vacuum box and two sets of traveling blow molds to provide "heat setting"; (8) PET extruder, vacuum box and two sets of traveling blow molds to provide "heat setting" wherein the first set of molds provides longitudinal stretching of a PET tube segment of up to 2.5 times its length prior to blowing; (9) PET extruder, vacuum box, heating oven and one set of traveling blow molds operated between about 32° F. and 60° F.; (10) PET extruder, vacuum box, heating oven and one set of traveling blow molds operated between about 32° F. and 60° F. and providing longitudinal stretching of a PET tube segment of up to 2.5 times its length prior to blowing; (11) PET extruder, vacuum box, heating oven and two sets of traveling blow molds to provide "heat setting"; and (12) PET extruder, vacuum box, heating oven and two sets of traveling blow molds to provide "heat setting" wherein the first set of molds provides longitudinal stretching of a PET tube segment of up to 2.5 times its length prior to blowing. It will be appreciated by those skilled in the art that various other apparatus combinations are suitable for the practice of the present invention.

In a preferred embodiment wherein multilayer articles are produced, the hollow tube is co-extruded from a plurality of extruders. By way of examples, the following multilayer combinations, among others, are contemplated: PET/high barrier PET/PET; PET/adhesive tie layer/EVOH/adhesive tie layer/PET; PET/tie layer/XHT/tie layer/PET. Additionally, multilayer articles may include one or more layers of regrind, as is well known in the art. The number of extruders required in multilayer article-producing apparatus corresponds to the number of layers desired. Using a specially adapted die head, as is known in the art, the output from the multiple extruders is formed into a multilayer hollow tube, which is then processed in generally the same way as the monolayer PET tube described previously. That is, it may pass through a vacuum box or vacuum box and heater, or sizing die, and then be taken up by traveling blow molds. The multilayer tube may also be stretched prior to blowing and it may be "heat set" in two sets of traveling molds. Thus, as will be appreciated, all the various alternative embodiments disclosed for the monolayer article-producing apparatus are suited to be used in conjunction with multiple extruders to form multilayer articles.

Finally, monolayer and multilayer articles can be produced according to this invention by using one or multiple extruders in a free-extrusion arrangement wherein the hollow PET tube is extruded vertically downward from the die head. The extruded tube may advantageously pass through a vacuum box with cooling means and a heater before being taken up in free extrusion blow molds. A wide variety of free extrusion blow mold arrangements are known in the art and are suitable for use in the present invention. Such mold arrangements include, for example, a horizontally disposed wheel having a plurality of blow molds thereon which indexes continuously so that the extruded tube is continuously taken up by the molds. In a free extrusion apparatus, the extruded tube can be blown using a core pin or needle blow-type blow mold and can be longitudinally stretched prior to blowing to achieve biaxial orientation in the finished product.

In a preferred method of this invention, PET pellets are fed into a single screw extruder. The pellets are heated in the barrel of the extruder to a temperature between about 520° F. and about 560° F. and are worked by the extruder screw to produce clear, homogenous, molten PET. The temperature of the molten PET is then generally lowered and the PET is extruded from the die head at a temperature between about 490°

F. and about 520° F. Preferably, the extruded PET tube has an inherent viscosity of between about 0.72 and about 0.85, and most preferably about 0.72, at which level the tube will not collapse immediately. Segments of the extruded tube are then enclosed in a series of oscillating blow molds and blown into the desired articles. The blow molds are preferably operated at a temperature of between about 32° F. and about 60° F. while the tube temperature is in the stretch orientation temperature range of PET, which is between about 195° F. and about 240° F. The circumferentially oriented blown articles are then released from the traveling blow molds and the tail and moille portions are trimmed therefrom.

Various alternative methods, which correspond to the various apparatus embodiments previously disclosed, are contemplated. Thus, in addition to the above, the method may include passing the extruded hollow tube, prior to blow molding, through a vacuum box and cooling means to conform the tube to a desired tubular standard and to cool the tube below the glass transition temperature of PET and then passing the tube through a heater oven (preferably RF quartz or other IR-type heater) to raise its temperature into the stretch orientation temperature range of PET. Alternatively, the extruded hollow tube may pass through a vacuum box and cooling means but not a heater means. In that situation, the extruded hollow tube is conformed to a desired tubular standard and cooled to a temperature in the stretch orientation temperature range of PET. The method may further include stretching tube segments up to 2.5 times their length prior to blow molding by means associated with the blow molds to form biaxially oriented articles. Another method embodiment includes the additional step of blowing the articles in a second set of blow molds, in which case the first set of molds are operated at a temperature above the glass transition temperature (Tg) of PET and the second set of molds are operated at a temperature between about 32° F. and about 45° F., to "heat set" the articles, thereby increasing their crystallinity to between about 30% and about 43%. In a method wherein biaxially oriented, heat set articles are produced, only the first of the two sets of blow molds contain tube stretching means. Finally, PET may be extruded from an extruder as described herein as a tube via free extrusion in a generally downward, vertical direction. A variety of blow mold arrangements are known for use in free extrusion blow molding operations and are suitable for use in conjunction with an extruder as described herein for producing monolayer articles.

The alternative method embodiments are equally well suited for producing multilayer articles and differ only in that the hollow tube is multilayer and is formed by co-extrusion of the desired component layers from separate extruders through a specially adapted die head, as is known in the art.

Brief Description of the Drawings

FIG. 4 is a cross-section of a PET extruder.

FIG. 5 is an enlarged view of a portion of an alternative embodiment of an extruder screw.

FIG. 6 is a cross-section of an alternative die head for use in a free-extrusion embodiment of the invention.

Detailed Description of the Invention

Figure 1:
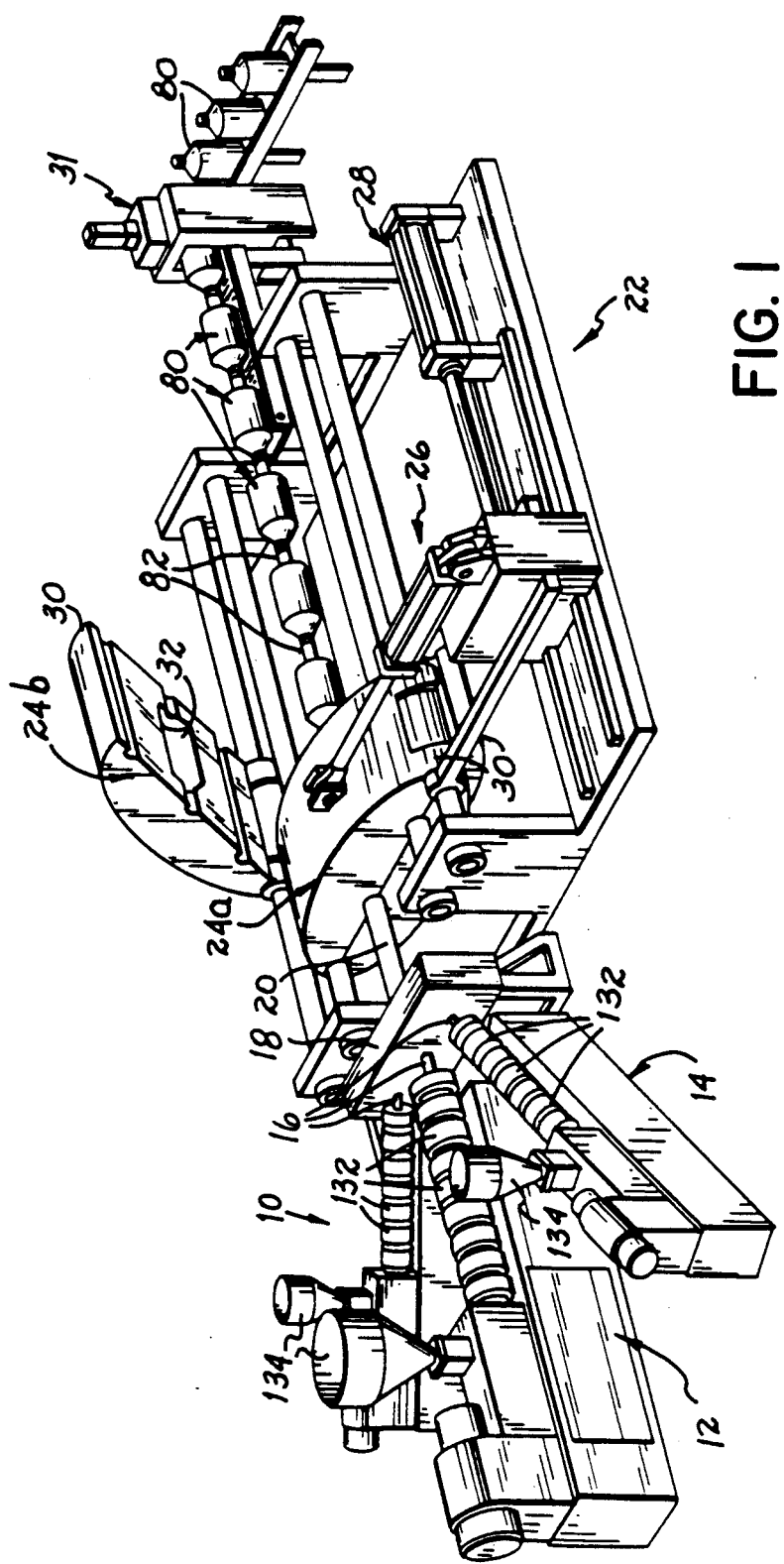
FIG. 1 is a perspective view of one embodiment of the apparatus of the invention.

FIG. 1 shows a preferred embodiment of the extrusion blow molding apparatus of the present invention. The apparatus shown in FIG. 1 may be used for producing monolayer or multilayer PET articles. As shown, the apparatus has a plurality of extruders, 10, 12 and 14, each of which extrudes one component-layer of the desired multilayer articles. Additional extruders may be used as required. In an alternative embodiment, wherein monolayer PET articles are produced, only one extruder, for example, extruder 12, is necessary. A preferred PET extruder for use in producing monolayer and, in conjunction with other extruders, for producing multilayer PET articles is shown in detail in FIG. 4. Extruders 10, 12, and 14 each have an output opening 16 which communicates with a die head 18 adjacent the extruders. The single or multiple components are continuously extruded through die head 18 as a hollow monolayer or multilayer tube, designated generally as 20. Both the above-mentioned embodiments require at least one single-screw extruder that is specially adapted to continuously extrude PET in the form of a hollow monolayer tube or as a component of a hollow multilayer tube such that the PET has sufficient hot melt strength to be subsequently blow molded.

A preferred PET extruder is shown in cross-section in FIG. 4. Extruder 100 comprises a barrel 120 having an input opening 122 and an output opening 124, an extrusion screw 126 disposed within barrel 120, a die adapter 128 attached to barrel 120 at an end adjacent output opening 124, a die head 130 attached to die adapter 128 opposite extruder barrel 120 and a plurality of heater bands 132 for heating the barrel, die adapter and die head. Input opening 122 may be fitted with a hopper 134 for charging the extruder with PET pellets. After charging, the PET pellets are heated and worked by extrusion screw 126 which imparts shear energy to the pellets as they travel along the extruder from input opening 122 to output opening 124.

A critical aspect of the present invention is providing extruded hollow tube 20 with sufficient hot melt strength that it will not collapse immediately after extrusion. It has been advantageously determined that PET tube 20 has sufficient hot melt strength when it is extruded at a temperature between about 490° F. and about 520° F. In addition to increasing the hot melt strength of tube 20, it is imperative that the extrudate be completely free of "non melt". Non melt is alleviated by raising the temperature of the PET pellets sufficiently high and imparting a sufficient amount of shear energy to the pellets to completely break them down as they are transferred along the extruder from input opening 122 to output opening 124. The PET pellets cannot be heated above 560° F., however, because that is the heat degradation temperature of PET. Thus, using heater bands 132 to heat extruder barrel 120, die adapter 128 and die head 130, the temperature of the PET can be maintained below the heat degradation temperature of PET.

Figure 4A:
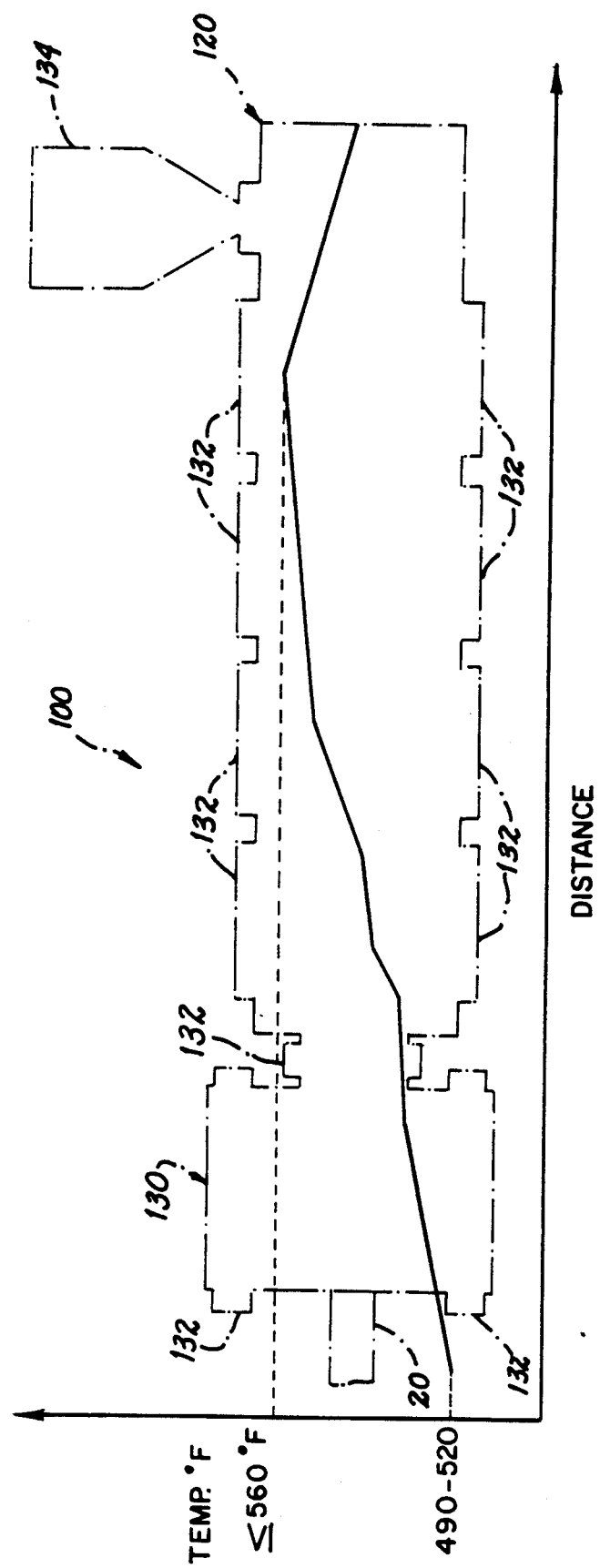
FIG. 4a shows a temperature profile of the PET in a PET extruder (shown in phantom).

FIG. 4A shows extruder 100 in phantom over a temperature profile. Heater bands 132 heat various zones of the extruder to predetermined temperatures. In the profile shown, which may be varied, the PET pellets are heated to a high temperature of about 560° F., for example, at an end of the extruder near input opening 122. The temperature of the PET is then generally lowered as it travels along the extruder and through output opening 124, die adapter 128 and die head 130, such that the extruded hollow tube 150 is at a temperature of between about 490° F. and about 520° F. The relatively lower temperature PET in the die head/die adapter/output opening area flows less freely than the relatively higher temperature PET near the input opening of the extruder barrel. The viscosity gradient resulting from this temperature gradient causes a back pressure in the extruder barrel which increases the shear energy imparted to the PET by extruder screw 126. As shown in FIG. 4, extruder screw 126 has a continuous helically disposed flight 136 along its length which defines gaps 150 between the flight and barrel wall which are smaller than those in standard PET extruders. The small gaps 150 impede the flow of the PET and further add to the shear energy imparted thereto. It should be appreciated, however, that various other extruder screw configurations are suitable for use in the practice of this invention. PET screw 126 also has a tapered tip 138 at the end adjacent output opening 124. Tapered tip 138 may have a plurality of lugs 140 thereon, as shown in FIG. 5, which further increase the shear energy imparted to the PET by impeding the flow thereof. This combination of heating and working the PET ensures a smooth, homogeneous melt.

Die head 130 may include means 140 for adjusting the wall thickness of extruded tube 20 so that various sized and shaped articles can be produced without changing die heads. A variety of such means are well known in the art. FIG. 6 shows an alternative die head configuration 160 which may be employed in the apparatus of this invention when free extrusion is being used in conjunction with blow molding. Alternative die head 160 has means 162 for adjusting the wall thickness of extruded tube 20 and also has heater bands 132.

Referring again to FIG. 1, the apparatus shown therein may be used to form monolayer PET articles or multilayer articles containing PET depending on whether a single PET extruder is used or a plurality of extruders are used, each of which extrudes one of the desired components of the multilayer article. Where multilayer articles are desired, the following multilayer combinations, among others, are contemplated: PET/high barrier PET/PET; PET/adhesive tie layer/EVOH/adhesive tie layer/PET; and PET/tie layer/XHT/tie layer/PET. In either case, the processing of hollow tube 20 after extrusion from die head 18 is substantially the same for multilayer and monolayer articles using the apparatus shown in FIG. 1.

Figure 7:
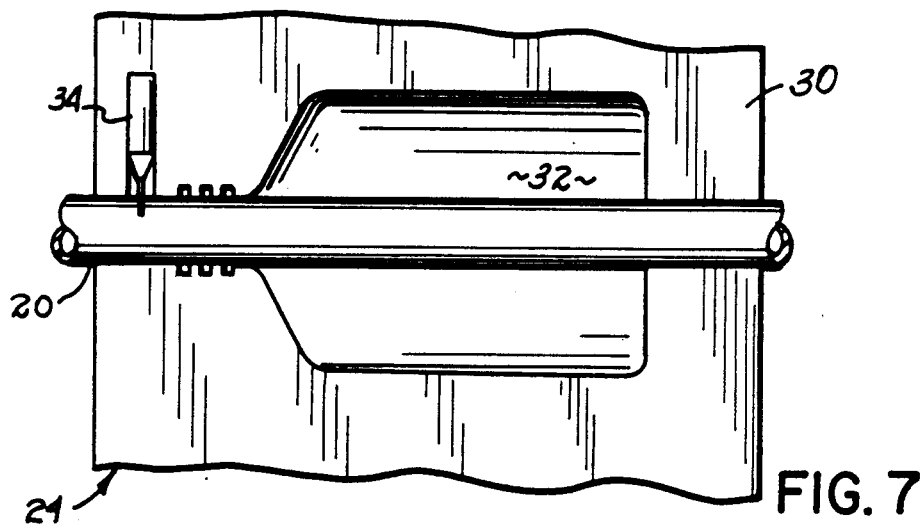
FIG. 7 shows one-half of a needle blow mold with a segment of PET tube therein.

Adjacent die head 18 is support structure 22 which supports a plurality of traveling clam shell-type blow molds 24. Each blow mold has means 26 for opening and closing the mold. FIG. 7 shows one-half of a typical blow mold used in the apparatus shown in FIG. 1. The blow mold half 30 has a cavity 32 and a means for needle blowing 34 hollow tube 20 to produce the desired article. It will be appreciated that FIG. 7 is merely representative of any of a variety of needle blow molds which are useful in this apparatus and are well known in the art.

In operation, as shown in FIG. 1, continuously extruded hollow tube 20 is continuously taken up by traveling blow molds 24 which oscillate longitudinally along support structure 22 in a path colinear with extruded hollow tube 20. Support structure 22 includes means 28, which may be a hydraulic cylinder mechanism, for example, for effecting the longitudinal oscillation of molds 24. The adjacent blow molds 24a and 24b face in opposite transverse directions relative the longitudinal direction of motion of the molds. In operation, blow mold 24a closes around extruded tube 20 closely adjacent die head 18. Mold 24a then moves longitudinally away from die head 18 at a rate substantially equal to the rate of extrusion of tube 20. As mold 24a moves longitudinally away from die head 18 the enclosed tube segment is blown into the desired article. Blow mold 24b moves longitudinally toward die head 18 in an open position, as shown in FIG. 1, concurrent with the longitudinal motion of mold 24a, such that the two molds pass each other without interfering with one another. After the desired article, designated as 80, has been blown, mold 24a opens to release article 80, which remains attached to adjacent articles 80 by tail and moille portions 82, and reverses directions to travel toward die head 18 to enclose another segment of tube 20 for blowing. As mold 24a travels toward die head 18 in an open position, mold 24b moves longitudinally away from die head 18 while blow molding an article. Through this continuous oscillation and blow molding, tube 20 is continuously blown into a series of articles 80. It will be appreciated that more than two blow molds can be used in this type of continuous longitudinal oscillation.

Figure 8:
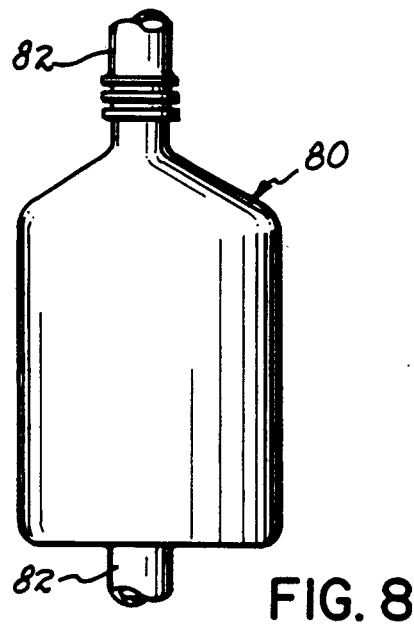
FIG. 8 shows a blown PET article with the tail and moille portion thereon.
Figure 9:
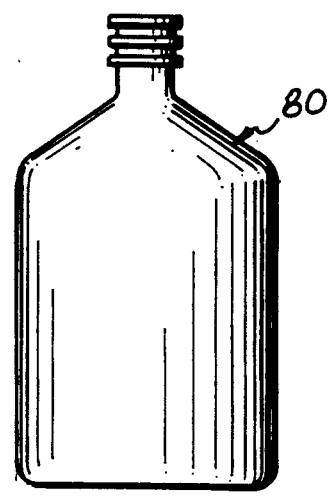
FIG. 9 shows a blown PET article wherein the tail and moille portions have been removed.
Figure 10:
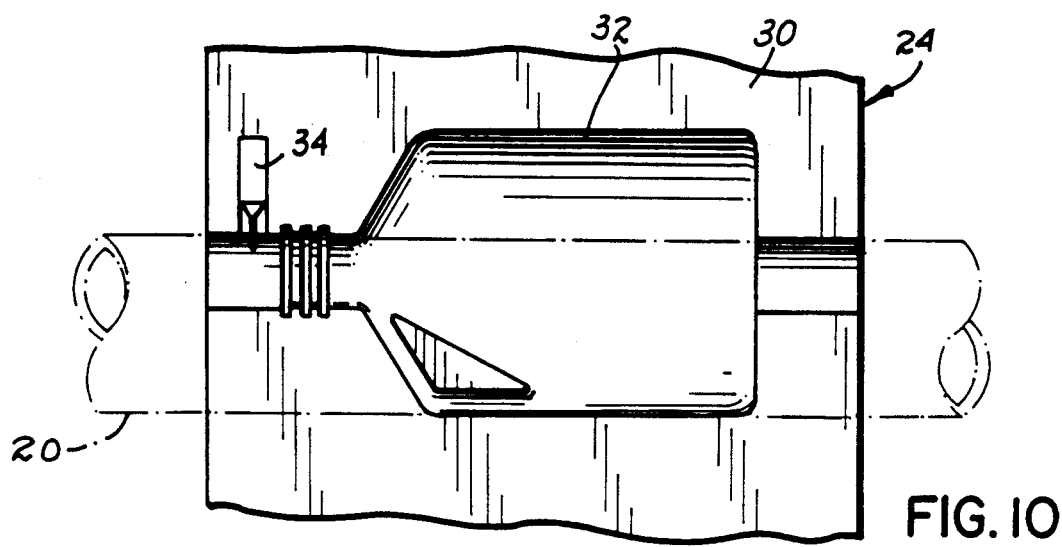
FIG. 10 shows one-half of a needle blow mold for blowing articles with integral handles wherein the extruded PET tube is shown in phantom.

Blown articles 80 continue to travel longitudinally away from die head 18 and are connected to one another by tail portion and moille portions 82 as shown in FIG. 8, partially broken away. The blown articles 80 are then passed through a trimming means 31 (well known in the art), which trims the tail and moille portions therefrom, thus providing the finished article, shown for example in FIG. 9. An alternative blow mold configuration, which provides articles with integral handles therein, is shown in FIG. 10. In addition, molds having multiple cavities therein (not shown) for producing a plurality of articles in one step are contemplated by this invention. Regardless of the type of mold used, i.e., single-article, multiple-article or article with integral handle, the molds are operated at a temperature between about 32° F. and about 60° F.

Figure 2:
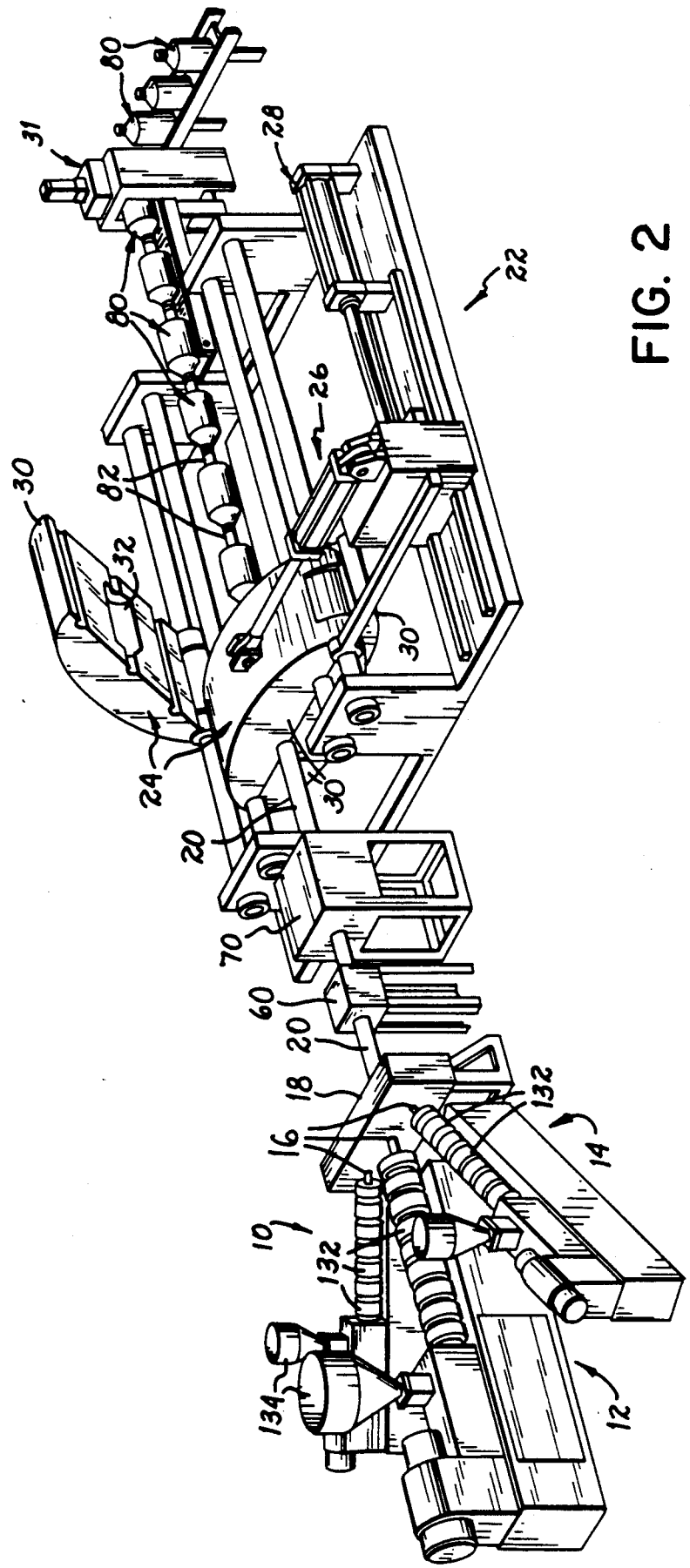
FIG. 2 is a perspective view of another embodiment of the apparatus of the invention.

FIG. 2 shows an alternative embodiment of the present invention. The apparatus therein is similar to that shown in FIG. 1 in that it includes a plurality of extruders 10, 12 and 14, a die head 18, a set of traveling blow molds 24, a support structure 22 for supporting the traveling blow molds, and a tail and moille trimmer 31. It will be appreciated that a single extruder 12 may be used in the apparatus shown in FIG. 2 for producing monolayer PET articles rather than multilayer PET articles. The embodiment shown in FIG. 2 further includes a vacuum box and cooling means 60 and a heater means 70. In one embodiment, vacuum box and cooling means 60 is positioned adjacent die head 18 such that extruded hollow tube 20 passes therethrough and heater means 70 is positioned adjacent vacuum box 60 on a side opposite die head 18 in line with vacuum box 60 such that extruded tube 20 passes therethrough and is subsequently taken up by traveling blow molds 24 and processed in a manner such as that described in conjunction with FIG. 1. In this embodiment, tube 20, which has been extruded at a temperature between about 490° F. and about 520° F., is cooled below its glass transition temperature ($T_g$) as it passes through vacuum box and cooling means 60 and is conformed to a desired tubular standard. Tube 20 is then heated to a temperature in the stretch orientation temperature range of polyethylene terephthalate by heater means 70. Vacuum box and cooling means 60 can be of any suitable type known in the art, and heating means 70 can also be of any suitable type known in the art, but is preferably an RF quartz heater or any other IR-type heater. In an alternative embodiment not shown, the apparatus has a vacuum box and cooling means but no heater means. In this embodiment, the vacuum box and cooling means is operated such that the hollow tube 20 is cooled to a temperature in the stretch orientation temperature range of PET and conformed to a desired tubular standard and then immediately taken up by the blow molds for blowing.

Figure 3:
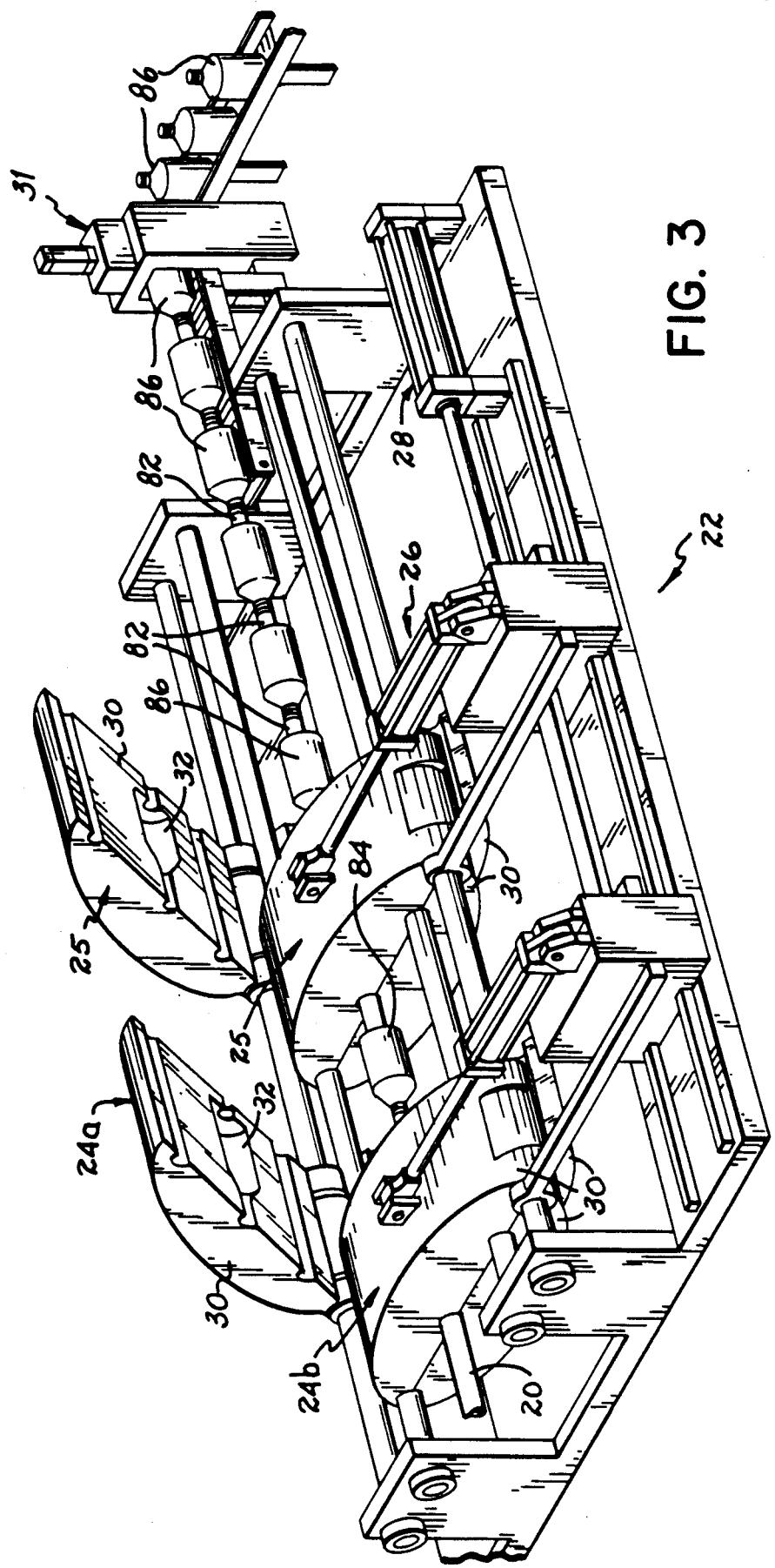
FIG. 3 is a perspective view of another embodiment of the molding portion of the apparatus of the invention.

In another alternative embodiment, shown in FIG. 3 without extruder, vacuum box and heater means, the apparatus includes two sets of traveling blow molds 24 and 25. The apparatus of this embodiment can produce monolayer and multilayer articles and may include a vacuum box and cooling means and heating means or a vacuum box and cooling means alone. The two sets of blow molds 24 and 25 operate substantially the same as the single set 24 shown in FIGS. 1 and 2 and described hereinabove with the exception that motion of the molds 25 in the second set do not overlap with the motion of the molds 24 in the first set. Thus, after blown article 84 is released from a mold in the first set 24 it is enclosed in a mold from the second set 25 and blown again. Subsequent to the second blowing operation, the article 86 is released and passed through a trimming means 31 which trims the tail and moille portions therefrom. In this double-blowing embodiment, the blown articles are "heat set" (i.e., their glass transition temperature is raised) by operating the first set of molds at a temperature between about 195° F. and about 240° F. and operating the second set of blow molds at a temperature between about 32° F. and about 45° F. Heat setting increases the crystallinity of the final blown articles to between about 30% and about 43%, thus enhancing their barrier properties.

The articles produced using the various apparatus embodiments shown in FIGS. 1, 2 and 3, and blow molds of the type shown in FIGS. 7 and 10, and others described hereinabove, may be multilayer or monolayer and they may be heat set; however, such articles are circumferentially oriented only because the tube segments from which they are blown are not stretched longitudinally to provide axial orientation. Using an alternative set or sets of blow molds in conjunction with the apparatus shown in FIGS. 1, 2 and 3, biaxailly oriented articles can be produced. The alternative blow molds 40 are shown for example in FIGS. 11 and 12 and comprise a blow mold cavity 42, a needle blow mechanism (shown generally as 34), a tube stretching means 46 and a recess 52 for housing tube gripping means 50 when blow mold 40 is in a closed, blow molding position. Tube stretching means 46 has a means 48 for effecting the longitudinal motion of tube gripping means 50 at a rate sufficiently faster than the rate at which blow mold 40 travels so that the tube segment is stretched up to 2.5 times its original length prior to blowing. FIG. 12 shows tube gripping means 50 disposed within recess 52 subsequent to a stretching operation with the stretched tube segment shown in phantom. Molds of the type described are useful in conjunction with all the previously described apparatus variations. Thus, the invention contemplates biaxially oriented monolayer and multilayer articles which may or may not be "heat set". Where heat setting is desired, only the first set of traveling blow molds includes tube stretching means.

In a preferred method of this invention, using the apparatus shown in FIGS. 1 and 4, PET pellets are charged into extruder 100 through hopper 134 and then heated by heater bands 132, to a temperature not to exceed about 560° F., and worked by helical flight 136, or suitable alternative, on extruder screw 126 to form homogenous molten PET. The temperature of the molten PET is lowered as it travels along extruder barrel 120 through die adapter 128 and die head 130, as shown in the temperature profile in FIG. 4a, such that it is extruded in the form of a hollow tube 20 at a temperature between about 490° F. and about 520° F. Segments of hollow tube 20 are subsequently enclosed in series by a set of oscillating blow molds 24, which are operated at a temperature between about 32° F. and about 60° F. Each enclosed tube segment is then blown into the desired article as the mold (24a or 26b) travels longitudinally away from die head 18. Once the blow molding operation is completed, blown articles 80 are released from the molds and pass through a trimming apparatus 31, which trims the tail and moille portions 82 from the blown articles 80.

An alternative method includes passing extruded hollow tube 20 through vacuum box and cooling means 60, shown in FIG. 2, after extrusion, to conform tube 20 to a desired tubular standard and to lower its temperature below the glass transition temperature of PET. Subsequently, tube 20 passes through heater means 70 (preferably an RF quartz heater or any other IR-type heater) to raise its temperature into the stretch orientation temperature range of PET. Thereafter, the method is substantially the same as that described above. In another alternative method, tube 20 passes through a vacuum box and cooling means 60 prior to blow molding, but no heater means 70 is employed. In this method, vacuum box and cooling means 60 conforms tube 20 to a desired tubular standard and cools it to a temperature in the stretch orientation temperature range of PET.

Figure 11:
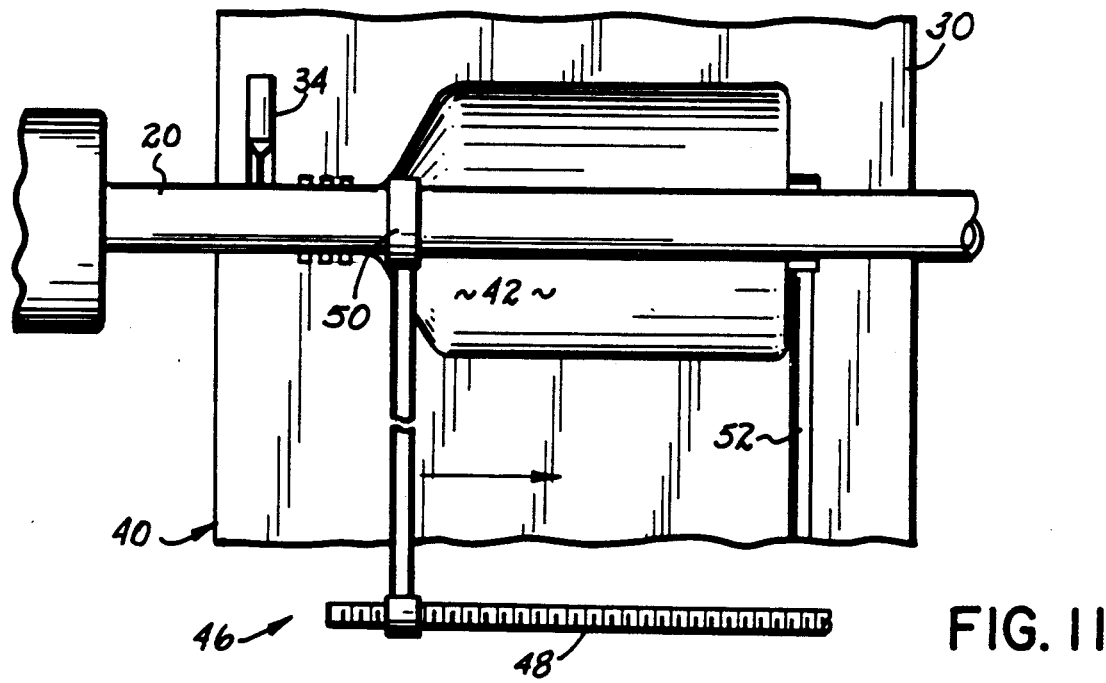
FIG. 11 shows one-half of a needle blow mold with tube stretching means prior to tube stretching.
Figure 12:
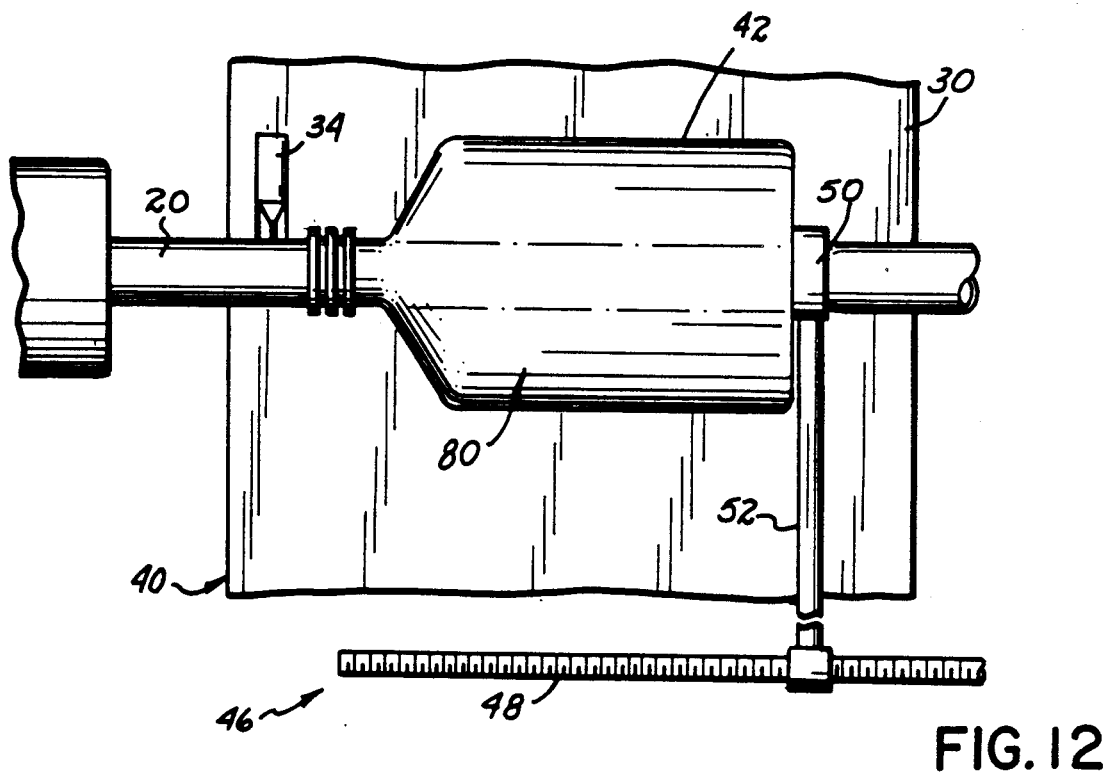
FIG. 12 shows one-half of a needle blow mold with tube stretching means subsequent to tube stretching.

An additional method employs a set of molds 40, as shown in FIGS. 11 and 12, which stretch tube segments up to 2.5 times their original length prior to blow molding to produce biaxially oriented articles. Molds 40 can be used in the methods disclosed wherein tube 20 passes through vacuum box 60 and heater 70, or only through vacuum box 60, or through neither.

A further noted method includes the additional step of enclosing blown articles 84 in molds from a second set of blow molds 25, after their release from the first set of molds 24, and blowing the articles a second time. In this method, the first set of molds 24 are operated at a temperature above the glass transition temperature of PET and the second set of molds are operated at a temperature between about 32° F. and about 45° F. to heat set the blown articles, thereby increasing their crystallinity to between about 30% and about 43%. Where biaxially oriented, heat set articles are produced, the tube stretching means 46 is associated with the first set of molds (40 in this embodiment).

It will be understood by those skilled in the art that various modifications may be made in the disclosed method and apparatus without departing from the spirit and scope of the invention and that the invention is not to be limited in any way except as defined by the scope of the appended claims.

What is claimed is:

1. An apparatus for extrusion blow molding circumferentially oriented monolayer polyethylene terephthalate articles, comprising:

(a) an extruder for extruding monolayer polyethylene terephthalate as a hollow tube, said extruder having a barrel with an input opening and an output opening, an extrusion screw disposed within said barrel, means for rotating said screw, a die head attached to said barrel at an end adjacent said output opening, and a plurality of extruder heating means for independently heating a plurality of zones of said barrel and die head to predetermined temperatures which in turn heat the polyethylene terephthalate to predetermined temperatures as it passes from said input opening to said output opening and through said die head, said screw having a tapered tip at an end adjacent said die head;

(b) means for controlling said extruder and die head heating means to establish a reverse temperature gradient along the combined length of said extruder barrel and said die head beginning at a maximum temperature at the input end of said extruder in the approximate range of 520° F–560° F. and ending at a minimum temperature at the output of said die head in the approximate range of 490° F.–520° F., to thereby increase the viscosity of the polyethylene terephthalate along the length of said extruder and establish a viscosity gradient-induced back pressure in said extruder barrel;

(c) means for imparting sufficient shear energy to the molten polyethylene terephthalate to render it substantially clear, homogenous and free of non-melted pellets at the input to said die head;

(d) a structure adjacent said extruder for supporting a plurality of traveling blow molds and means for oscillating said blow molds longitudinally on said support structure along a path colinear with the extruded hollow tube, said molds supported such that each mold faces in a direction transverse the path of the extruded hollow tube and each mold faces in the opposite transverse direction of an adjacent mold; and (e) a plurality of traveling blow molds supported by said support structure, each said mold having means for opening and closing and each said mold positioned and configured to close around the hollow tube as it is extruded from said die head to enclose a segment thereof, to travel longitudinally away from said die head in a closed position at a rate substantially equal to the rate of extrusion of the hollow tube, to inject blow gas into the hollow tube as said mold travels away from said die head to form the desired article, to open and release the blown article, and to travel longitudinal toward said die head in an open position.

2. An apparatus for extrusion blow molding circumferentially oriented monolayer polyethylene terephthalate articles, comprising:

(a) an extruder for extruding monolayer polyethylene terephthalate as a hollow tube, said extruder having a barrel with an input opening and an output opening, an extrusion screw disposed within said barrel, means for rotating said screw, a die head attached to said barrel at an end adjacent said output opening, and a plurality of extruder heating means for independently heating a plurality of zones of said barrel and die head to predetermined temperatures which in turn heat the polyethylene terephthalate to predetermined temperatures as it passes from said input opening to said output opening and through said die head, said screw having a tapered tip at an end adjacent said die head;

(b) means for controlling said extruder and die head heating means to establish a reverse temperature gradient along the combined length of said extruder barrel and said die head beginning at a maximum temperature at the input end of said extruder in the approximate range of 520° F–560° F. and ending at a minimum temperature at the output of said die head in the approximate range of 490° F–520° F., to thereby increase the viscosity of the polyethylene terephthalate along the length of said extruder and establish a viscosity gradient-induced back pressure in said extruder barrel;

(c) means for imparting sufficient shear energy to the molten polyethylene terephthalate to render it substantially clear, homogenous and free of non-melted pellets at the input to said die head;

(d) a vacuum box and cooling means adjacent said extruder through which the hollow tube passes prior to blow molding for conforming the tube to a desired tubular standard and such that the tube is at a temperature in the stretch orientation temperature range of polyethylene terephthalate;

(e) a structure adjacent said vacuum box and cooling means opposite said extruder for supporting a plurality of traveling blow molds and means for oscillating said blow molds longitudinally on said support structure along a path colinear with the extruded hollow tube, said molds supported such that each mold faces in a direction transverse the path of the extruded hollow tube and each mold faces in the opposite transverse direction of an adjacent mold; and (f) a plurality of traveling blow molds supported by said support structure, each said mold having means for opening and closing and each said mold positioned and configured to close around the hollow tube after it passes through said vacuum box and cooling means to enclose a segment thereof, to travel longitudinally away from said vacuum box in a closed position at a rate substantially equal to the rate of extrusion of the hollow tube, to inject blow gas into the hollow tube as said mold travels away from said vacuum box to form the desired article, to open and release the blown article, and to travel longitudinally toward said vacuum box in an open position.

3. An apparatus for extrusion blow molding circumferentially oriented monolayer polyethylene terephthalate articles, comprising:

(a) an extruder for extruding monolayer polyethylene terephthalate as a hollow tube, said extruder having a barrel with an input opening and an output opening, an extrusion screw disposed within said barrel, means for rotating said screw, a die head attached to said barrel at an end adjacent said output opening, and a plurality of extruder heating means for independently heating a plurality of zones of said barrel and die head to predetermined temperatures which in turn heat the polyethylene terephthalate to predetermined temperatures as it passes from said input opening to said output opening and through said die head, said screw having a tapered tip at an end adjacent said die head;

(b) means for controlling said extruder and die head heating means to establish a reverse temperature gradient along the combined length of said extruder barrel and said die head beginning at a maximum temperature at the input end of said extruder in the approximate range of 520° F–560° F. and ending at a minimum temperature at the output of said die head in the approximate range of 490° F.–520° F., to thereby increase the viscosity of the polyethylene terephthalate along the length of said extruder and establish a viscosity gradient-induced back pressure in said extruder barrel;

(c) means for imparting sufficient shear energy to the molten polyethylene terephthalate to render it substantially clear, homogenous and free of nonmelted pellets at the input to said die head;

(d) a vacuum box and cooling means adjacent said extruder through which the hollow tube passes for conforming the tube to a desired tubular standard and such that the tube temperature is below the glass transition temperature of polyethylene terephthalate;

(e) a heater means through which the hollow tube passes adjacent said vacuum box opposite said extruder for heating said hollow tube to a temperature in the stretch orientation temperature range of polyethylene terephthalate;

(f) a structure adjacent said heater means opposite said vacuum box for supporting a plurality of traveling blow molds and means for oscillating said blow molds longitudinally on said support structure along a path colinear with the extruded hollow tube, said molds supported such that each mold faces in a direction transverse the path of the extruded hollow tube and each mold faces in the opposite transverse direction of an adjacent mold; and (g) a plurality of traveling blow molds supported by said support structure, each said mold having means for opening and closing and each said mold positioned and configured to close around the hollow tube after it passes through said heater means to enclose a segment thereof, to travel longitudinally away from said heater means in a closed position at a rate substantially equal to the rate of extrusion of the hollow tube, to inject blow gas into the hollow tube as said mold travels away from said heater means to form the desired article, to open and release the blown article, and to travel longitudinally toward said heater means in an open position.

4. The apparatus as recited in claim 1, 2 or 3 wherein said blow molds are operated at a temperature between about 32° F. and about 60° F.

5. The apparatus as recited in claim 1, 2 or 3 wherein said die head includes means for controlling the wall thickness of the extruded hollow tube.

6. The apparatus as recited in claim 1, 2 or 3 wherein each said traveling blow mold is a multicavity mold for forming a plurality of polyethylene terephthalate articles simultaneously.

7. The apparatus as recited in claim 1, 2 or 3 wherein each said traveling blow mold is configured to mold articles with integral handles.

8. The apparatus as recited in claim 1, 2 or 3 wherein said shear energy imparting means comprises a relatively small spacing between flights on said extrusion screw and an inside wall of said barrel, and a plurality of lugs on said tapered tip of said extrusion screw.

9. An apparatus for extrusion blow molding circumferentially oriented multilayer articles wherein at least one layer is polyethylene terephthalate, comprising:

(a) a plurality of extruders each having an input opening and an output opening for extruding one component layer of a multilayer hollow tube, each said extruder having a barrel, an extrusion screw disposed within said barrel, and means for rotating said screw, at least one said extruder for extruding a polyethylene terephthalate layer of said multilayer hollow tube, said polyethylene terephthalate extruder having a plurality of extruder heating means for independently heating a plurality of zones of said barrel to predetermined temperatures which in turn heat the polyethylene terephthalate to predetermined temperatures as it passes from said input opening to said output opening, said polyethylene terephthalate extruder screw having a tapered tip at an end adjacent said output opening;

(b) a die head attached to said barrels of said extruders at their output openings for forming a multilayer hollow tube, said die head having heating means for heating said multilayer hollow tube to a predetermined temperature;

(c) means for controlling said extruder and die head heating means to establish a reverse temperature gradient along the combined length of said extruder barrel and said die head beginning at a maximum temperature at the input end of said extruder in the approximate range of 520° F.–560° F. and ending at a minimum temperature at the output of said die head in the approximate range of 490° F.–520° F., to thereby increase the viscosity of the polyethylene terephthalate along the length of said extruder and establish a viscosity gradient-induced back pressure in said extruder barrel;

(d) means for imparting sufficient shear energy to the molten polyethylene terephthalate to render it substantially clear, homogenous and free of nonmelted pellets at the input to said die head;

(e) a structure adjacent said extruder for supporting a plurality of traveling blow molds and means for oscillating said blow molds longitudinally on said support structure along a path colinear with the extruded hollow tube, said molds supported such that each mold faces in a direction transverse the path of the extruded hollow tube and each mold faces in the opposite transverse direction of an adjacent mold; and (f) a plurality of traveling blow molds supported by said support structure, each said mold having means for opening and closing and each said mold positioned and configured to close around the hollow tube as it is extruded from said die head to enclose a segment thereof, to travel longitudinally away from said die head in a closed position at a rate substantially equal to the rate of extrusion of the hollow tube, to inject blow gas into the hollow tube as said mold travels away from said die head to form the desired article, to open and release the blown article, and to travel longitudinally toward said die head in an open position.

10. An apparatus for extrusion blow molding circumferentially oriented multilayer articles wherein at least one layer is polyethylene terephthalate, comprising:

(a) a plurality of extruders each having an input opening and an output opening for extruding one component layer of a multilayer hollow tube, each said extruder having a barrel, an extrusion screw disposed within said barrel, and means for rotating said screw, at least one said extruder for extruding a polyethylene terephthalate layer of said multilayer hollow tube, said polyethylene terephthalate extruder having a plurality of extruder heating means for independently heating a plurality of zones of said barrel to predetermined temperatures which in turn heat the polyethylene terephthalate to predetermined temperatures as it passes from said input opening to said output opening, said polyethylene terephthalate extruder screw having a tapered tip at an end adjacent said output opening;

(b) a die head attached to said barrels of said extruders at their output openings for forming a multilayer hollow tube, said die head having heating means for heating said multilayer hollow tube to a predetermined temperature;

(c) means for controlling said extruder and die head heating means to establish a reverse temperature gradient along the combined length of said extruder barrel and said die head beginning at a maximum temperature at the input end of said extruder in the approximate range of 520° F.-560° F. and ending of a minimum temperature at the output of said die head in the approximate range of 490° F.-520° F., to thereby increase the viscosity of the polyethylene terephthalate along the length of said extruder and establish a viscosity gradient-induced back pressure in said extruder barrel;

(d) means for imparting sufficient shear energy to the molten polyethylene terephthalate to render it substantially clear, homogeneous and free of non-melted pellets at the input to said die head;

(e) a vacuum box and cooling means adjacent said extruder through which the hollow tube passes prior to blow molding for conforming the tube to a desired tubular standard and such that the tube is at a temperature in the stretch orientation temperature range of polyethylene terephthalate;

(f) a structure adjacent said vacuum box and cooling means opposite said extruder for supporting a plurality of traveling blow molds and means for oscillating said blow molds longitudinally on said support structure along a path colinear with the extruded hollow tube, said molds supported such that each mold faces in a direction transverse the path of the extruded hollow tube and each mold faces in the opposite transverse direction of an adjacent mold; and (g) a plurality of traveling blow molds supported by said support structure, each said mold having means for opening and closing and each said mold positioned and configured to close around the hollow tube after it passes through said vacuum box and cooling means to enclose a segment thereof, to travel longitudinally away from said vacuum box in a closed positioned at a rate substantially equal to the rate of extrusion of the hollow tube, to inject blow gas into the hollow tube as said mold travels away from said vacuum box to form the desired article, to open and release the blown article, and to travel longitudinally toward said vacuum box in an open position.

11. An apparatus for extrusion blow molding circumferentially oriented multilayer articles wherein at least one layer is polyethylene terephthalate, comprising:

(a) a plurality of extruders each having an input opening and an output opening for extruding one component layer of a multilayer hollow tube, each said extruder having a barrel, an extrusion screw disposed within said barrel, and means for rotating said screw, at least one said extruder for extruding a polyethylene terephthalate layer of said multilayer hollow tube, said polyethylene terephthalate extruder having a plurality of extruder heating means for independently heating a plurality of zones of said barrel to predetermined temperatures which in turn heat the polyethylene terephthalate to predetermined temperatures as it passes from said input opening to said output opening, said polyethylene terephthalate extruder screw having a tapered tip at an end adjacent said output opening;

(b) a die head attached to said barrels of said extruders at their output openings for forming am multilayer hollow tube, said die head having heating means for heating said multilayer hollow tube to a predetermined temperature;

(c) means for controlling said extruder and die head heating means to establish a reverse temperature gradient along the combined length of said extruder barrel and said die head beginning at a maximum temperature at the input end of said extruder in the approximate range of 520° F.-560° F. and ending at a minimum temperature at the output of said die head in the approximate range of 490° F.-520° F., to thereby increase the viscosity of the polyethylene terephthalate along the length of said extruder and establish a viscosity gradient-induced back pressure in said extruder barrel;

(d) means for imparting sufficient shear energy to the molten polyethylene terephthalate to render ib substantially clear, homogenous and free of nonmelted pellets at the input to said die head;

(e) a vacuum box and cooling means adjacent said extruder through which the hollow tube passes for conforming the tube to a desired tubular standard and such that the tube temperature is below the glass transition temperature of polyethylene terephthalate;

(f) a heater means through which the hollow tube passes adjacent said vacuum box opposite said extruder for heating said hollow tube to a temperature in the stretch orientation temperature range of polyethylene terephthalate;

(g) a structure adjacent said heater means opposite said vacuum box for supporting a plurality of traveling blow molds and means for oscillating said blow molds longitudinally on said support structure along a path colinear with the extruded hollow tube, said molds supported such that each mold faces in a direction transverse the path of the extruded hollow tube and each mold faces in the opposite transverse direction of an adjacent mold; and (h) a plurality of traveling blow molds supported by said support structure, each said mold having means for opening and closing and each said mold positioned and configured to close around the hollow tube after it passes through said heater means to enclose a segment thereof, to travel longitudinally away from said heater means in a closed position at a rate substantially equal to the rate of extrusion of the hollow tube, to inject blow gas into the hollow tube as said mold travels away from said heater means to form the desired article, to open and release the blown article, and to travel longitudinally toward said heater means in an open position.

12. The apparatus as recited in claim 9, 10 or 11 wherein said blow molds are operated at a temperature between about 32° F. and about 60° F.

13. The apparatus as recited in claim 9, 10 or 11 wherein said die head includes means for controlling the wall thickness of the extruded hollow tube.

14. The apparatus as recited in claim 9, 10 or 11 wherein each said traveling blow mold is a multicavity mold for forming a plurality of polyethylene terephthalate articles simultaneously.

15. The apparatus as recited in claim 9, 10 or 11 wherein each said traveling blow mold is configured to mold articles with integral handles.

16. The apparatus as recited in claim 9, 10 or 11 wherein said shear energy imparting means comprises a relatively small spacing between flights on said extrusion screw and an inside wall of said barrel, and a plurality of lugs on said tapered tip of said extrusion screw.

17. An apparatus for extrusion blow molding biaxially oriented monolayer polyethylene terephthalate articles, comprising:

(a) an extruder for extruding monolayer polyethylene terephthalate as a hollow tube, said extruder having a barrel with an input opening and an output opening, an extrusion screw disposed within said barrel, means for rotating said screw, a die head attached to said barrel at an end adjacent said output opening, and a plurality of extruder heating means for independently heating a plurality of zones of said barrel and die head to predetermined temperatures which in turn heat the polyethylene terephthalate to predetermined temperatures as it passes from said input opening to said output opening and through said die head, said screw having a tapered tip at an end adjacent said die head;

(b) means for controlling said extruder and die head heating means to establish a reverse temperature gradient along the combined length of said extruder barrel and said die head beginning at a maximum temperature at the input end of said extruder in the approximate range of 520° F.-560° F. and ending at a minimum temperature at the output of said die head in the approximate range of 490° F.-520° F., to thereby increase the viscosity of the polyethylene terephthalate along the length of said extruder and establish a viscosity gradient-induced back pressure in said extruder barrel;

(c) means for imparting sufficient shear energy to the molten polyethylene terephthalate to render it substantially clear, homogeneous and free of non-melted pellets at the input to said die head;

(d) a structure adjacent said extruder for supporting a plurality of traveling blow molds and means for oscillating said blow molds longitudinally on said support structure along a path colinear with the extruded hollow tube, transverse the path of the extruded hollow tube and each mold faces in the opposite transverse direction of an adjacent mold; and (e) a plurality of traveling blow molds supported by said support structure, each said molding having means for opening and closing and each said mold positioned and configured to close around the hollow tube as it is extruded from said die head to enclose a segment thereof, each said mold also having means for stretching a tube segment up to 2.5 times its length prior to blow molding to provide axial orientation and each said mold also positioned and configured to travel longitudinally away from said die head in a closed position at a rate substantially equal to the rate of extrusion of the hollow tube, to inject blow gas into the hollow tube as said mold travels away from said die head to form the desired article, to open and release the blown article, and to travel longitudinally toward said die head in an open position.

18. An apparatus for extrusion blow molding biaxially oriented monolayer polyethylene terephthalate articles, comprising:

(a) an extruder for extruding monolayer polyethylene terephthalate as a hollow tube, said extruder having a barrel with an input opening and an output opening, an extrusion screw disposed within said barrel, means for rotating said screw, a die head attached to said barrel at an end adjacent said output opening, and a plurality of extruder heating means for independently heating a plurality of zones of said barrel and die head to predetermined temperatures which in turn head the polyethylene terephthalate to predetermined temperatures as it passes from said input opening to said output opening and through said die head, said screw having a tapered tip at an end adjacent said die head;

(b) means for controlling said extruder and die head heating means to establish a reverse temperature gradient along the combined length of said extruder barrel and said die head beginning at a maximum temperature at the input end of said extruder in the approximate range of 520° F.-560° F. and ending at a minimum temperature at the output of said die head in the approximate range of 490° F.-520° F., to thereby increase the viscosity of the polyethylene terephthalate along the length of said extruder and establish a viscosity gradient-induced back pressure in said extruder barrel;

(c) means for imparting sufficient shear energy to the molten polyethylene terephthalate to render it substantially clear, homogenous and free of non-melted pellets at the input to said die head;

(d) a vacuum box and cooling means adjacent said extruder through which the hollow tube passes prior to blow molding for conforming the tube to a desired tubular standard and such that the tube is at a temperature in the stretch orientation temperature range of polyethylene terephthalate;

(e) a structure adjacent said vacuum box and cooling means opposite said extruder for supporting a plurality of traveling blow molds and means for oscillating said blow molds longitudinally on said support structure along a path colinear with the extruded hollow tube, said molds supported such that each mold faces in a direction transverse the path of the extruded hollow tube and each mold faces in the opposite transverse direction of an adjacent mold; and (f) a plurality of traveling blow molds supported by said support structure, each said mold having means for opening and closing and each said mold positioned and configured to close around the hollow tube after it passes through said vacuum box to enclose a segment thereof, each said mold also having means for stretching a tube segment up to 2.5 times its length prior to blow molding to provide axial orientation and each said mold also positioned and configured to travel longitudinally away from said vacuum box in a closed positioned at a rate substantially equal to the rate of extrusion of the hollow tube, to inject blow gas into the hollow tube as said mold travels away from said vacuum box to form the desired article, to open and release the blown article, and to travel longitudinally toward said vacuum box in an open position.

19. An apparatus for extrusion blow molding biaxially oriented monolayer polyethylene terephthalate articles, comprising:

(a) an extruder for extruding monolayer polyethylene terephthalate as a hollow tube, said extruder having a barrel with an input opening and an output opening, an extrusion screw disposed within said barrel, means for rotating said screw, a die head attached to said barrel at an end adjacent said output opening, and a plurality of extruder heating means for independently heating a plurality of zones of said barrel and die head to predetermined temperatures which in turn head the polyethylene terephthalate to predetermined temperatures as it passes from said input opening to said output opening and through said die head, said screw having a tapered tip at an end adjacent said die head;

(b) means for controlling said extruder and die head heating means to establish a reverse temperature gradient along the combined length of said extruder barrel and said die head beginning at a maximum temperature at the input end of said extruder in the approximate range of 520° F.–560° F. and ending at a minimum temperature at the output of said die head in the approximate range of 490° F.–520° F., to thereby increase the viscosity of the polyethylene terephthalate along the length of said extruder and establish a viscosity gradient-induced back pressure in said extruder barrel;

(c) means for imparting sufficient shear energy to the molten polyethylene terephthalate to render it substantially clear, homogenous and free of non-melted pellets at the input to said die head;

(d) a vacuum box and cooling means adjacent said extruder through which the hollow tube passes for conforming the tube to a desired tubular standard and such that the tube temperature is below the glass transition temperature of polyethylene terephthalate;

(e) a heater means through which the hollow tube passes adjacent said vacuum box opposite said extruder for heating said hollow tube to a temperature in the stretch orientation temperature range of polyethylene terephthalate;

(f) a structure adjacent said heater means opposite said vacuum box for supporting a plurality of traveling blow molds and means for oscillating said blow molds longitudinally on said support structure along a path colinear with the extruded hollow tube, said molds supported such that each mold faces in a direction transverse the path of the extruded hollow tube and each mold faces in the opposite transverse direction of an adjacent mold; and (g) a plurality of traveling blow molds supported by said support structure, each said mold having means for opening and closing and each said mold positioned and configured to close around the hollow tube after it passes through said heater means to enclose a segment thereof, each said mold also having means for stretching a tube segment up to 2.5 times its length prior to blow molding to provide axial orientation and each said mold also positioned and configured to travel longitudinally away from said heater means in a closed positioned at a rate substantially equal to the rate of extrusion of the hollow tube, to inject blow gas into the hollow tube as said mold travels away from said heater means to form the desired article, to open and release the blown article, and to travel longitudinally toward said heater means in an open position.

20. The apparatus as recited i claim 17, 18 or 19 wherein said blow molds are operated at a temperature between about 32° F. and about 60° F.

21. The apparatus as recited in claim 17, 18 or 19 wherein said die head includes means for controlling the wall thickness of the extruded hollow tube.

22. The apparatus as recited in claim 17, 18 or 19 wherein each said traveling blow mold is a multicavity mold for forming a plurality of polyethylene terephthalate articles simultaneously.

23. The apparatus as recited in claim 17, 18 or 19 wherein each said traveling blow mold is configured to mold articles with integral handles.

24. The apparatus as recited in claim 17, 18 or 19 wherein said shear energy imparting means comprises a relatively small spacing between flights on said extrusion screw and an inside wall of said barrel, and a plurality of lugs on said tapered tip of said extrusion screw.

25. An apparatus for extrusion blow molding biaxially oriented multilayer articles wherein at least one layer is polyethylene terephthalate, comprising:

(a) a plurality of extruders each having an input opening and an output opening for extruding one component layer of a multilayer hollow tube, each said extruder having a barrel, an extrusion screw disposed within said barrel, and means for rotating said screw, at least one said extruder for extruding a polyethylene terephthalate layer of said multilayer hollow tube, said polyethylene terephthalate extruder having a plurality of extruder heating means for independently heating a plurality of zones of said barrel to predetermined temperatures which in turn heat the polyethylene terephthalate to predetermined temperatures as it passes from said input opening to said output opening, said polyethylene terephthalate extruder screw having a tapered tip at an end adjacent said output opening;

(b) a die head attached to said barrels of said extruders at their output openings for forming a multilayer hollow tube, said die head having heating means for heating said multilayer hollow tube to a predetermined temperature;

(c) means for controlling said extruder and die head heating means to establish a reverse temperature gradient along the combined length of said extruder barrel and said die head beginning at a maximum temperature at the input end of said extruder in the approximate range of 520° F.-560° F. and ending at a minimum temperature at the output of said die head in the approximate range of 490° F.-520° F., to thereby increase the viscosity of the polyethylene terephthalate along the length of said extruder and establish a viscosity gradient-induced back pressure in said extruder barrel;

(d) mans for imparting sufficient shear energy to the molten polyethylene terephthalate to render it substantially clear, homogeneous and free of non-melted pellets at the input to said die head;

(e) a structure adjacent said extruder for supporting a plurality of traveling blow molds and means for oscillating said blow molds longitudinally on said support structure along a path colinear with the extruded hollow tube, said molds supported such that each mold faces in a direction transverse the path of the extruded hollow tube and each mold faces in the opposite transverse direction of an adjacent mold; and (f) a plurality of traveling blow molds supported by said support structure, each said mold having means for opening and closing and each said mold positioned and configured to close around the hollow tube as it is extruded from said die head to enclose a segment thereof, each said mold also having means for stretching a tube segment up to 2.5 times its length prior to blow molding to provide axial orientation and each said mold also positioned and configured to travel longitudinally away from said die head in a closed position at a rate substantially equal to the rate of extrusion of the hollow tube, to inject blow gas into the hollow tube as said mold travels away from said die head to form the desired article, to open and release the blown article, and to travel longitudinally toward said die head in an open position.

26. An apparatus for extrusion blow molding biaxially oriented multilayer articles wherein at least one layer is polyethylene terephthalate, comprising:

(a) a plurality of extruders each having an input opening and an output for extruding one component layer of a multilayer hollow tube, each said extruder having a barrel, an extrusion screw disposed within said barrel, and means for rotating said screw, at least one said extruder for extruding a polyethylene terephthalate layer of said multilayer hollow tube, said polyethylene terephthalate extruder having a plurality of extruder heating means for independently heating a plurality of zones of said barrel to predetermined temperatures which in turn heat the polyethylene terephthalate to predetermined temperatures as it passes from said input opening to said output opening, said polyethylene terephthalate extruder screw having a tapered tip at an end adjacent said output opening;

(b) a die head attached to said barrels of said extruders at their output openings for forming a multilayer hollow tube, said die head having heating means for heating said multilayer hollow tube to a predetermined temperature;

(c) means for controlling said extruder and die head heating means to establish a reverse temperature gradient along the combined length of said extruder barrel and said die head beginning at a maximum temperature at the input end of said extruder in the approximate range of 520° F.-560° F. and ending at a minimum temperature at the output of said die head in the approximate range of 490° F.-520° F., to thereby increase the viscosity of the polyethylene terephthalate along the length of said extruder and establish a viscosity gradient-induced back pressure in said extruder barrel;

(d) means for imparting sufficient shear energy to the molten polyethylene terephthalate to render it substantially clear, homogeneous and free of non-melted pellets at the input to said die head;

(e) a vacuum box and cooling means adjacent said extruder through which the hollow tube passes prior to blow molding for conforming the tube to a desired tubular standard and such that the tube is at a temperature in the stretch orientation temperature range of polyethylene terephthalate;

(f) a structure adjacent said vacuum box and cooling means opposite said extruder for supporting a plurality of traveling blow molds and means for oscillating said blow molds longitudinally on said support structure along a path colinear with the extruded hollow tube, said molds supported such that each mold faces in a direction transverse the path of the extruded hollow tube and each mold faces in the opposite transverse direction of an adjacent mold; and (g) a plurality of traveling blow molds supported by said supported structure, each said mold having means for opening and closing and each said mold positioned and configured to close around the hollow tube after it passes through said vacuum box to enclose a segment thereof, each said mold also having means for stretching a tube segment up to 2.5 times its length prior to blow molding to provide axial orientation and each said mold also positioned and configured to travel longitudinally away from said vacuum box in a closed positioned at a rate substantially equal to the rate of extrusion of the hollow tube, to inject blow gas into the hollow tube as said mold travels away from said vacuum box to form the desired article, to open and release the blow article, and to travel longitudinally toward said vacuum box in an open position.

27. An apparatus for extrusion blow molding biaxially oriented multilayer articles wherein at least one layer is polyethylene terephthalate, comprising:

(a) a plurality of extruders each having an input opening and an output opening for extruding one component layer of a multilayer hollow tube, each said extruder having a barrel, an extrusion screw disposed within said barrel, and means for rotating said screw, at least one said extruder for extruding a polyethylene terephthalate layer of said multilayer hollow tube, said polyethylene terephthalate extruder having a plurality of extruder heating means for independently heating a plurality of zones of said barrel to predetermined temperatures which in turn heat the polyethylene terephthalate to predetermined temperatures as it passes from said input opening to said output opening, said polyethylene terephthalate extruder screw having a tapered tip at an end adjacent said output opening;

(b) a die head attached to said barrels of said extruders at their output openings for forming a multilayer hollow tube, said die head having heating means for heating said multilayer hollow tube to a predetermined temperature;

(c) means for controlling said extruder and die head heating means to establish a reverse temperature gradient along the combined length of said extruder barrel and said die head beginning at a maximum temperature at the input end of said extruder in the approximate range of 520° F.-560° F. and ending at a minimum temperature at the output of said die head in the approximate range of 490° F.-520° F., to thereby increase the viscosity of the polyethylene terephthalate along the length of said extruder and establish a viscosity gradient-induced back pressure in said extruder barrel;

(d) means for imparting sufficient shear energy to the molten polyethylene terephthalate to render it substantially clear, homogeneous and free of non-melted pellets at the input to said die head;

(e) a vacuum box and cooling means adjacent said extruder through which the hollow tubes passes for conforming the tube to the desired tubular standard and such that the tube temperature is below the glass transition temperature of polyethylene terephthalate;

(f) a heater means through which the hollow tube passes adjacent said vacuum box opposite said extruder for heating said hollow tube to a temperature in the strength orientation temperature range of polyethylene terephthalate;

(g) a structure adjacent said heater means opposite said vacuum box for supporting a plurality of traveling blow molds and means for oscillating said blow molds longitudinally on said support structure along a path colinear with the extruded hollow tube, said molds supported such that each mold faces in a direction transverse the path of the extruded hollow tube and each mold faces in the opposite transverse direction of an adjacent mold; and (h) a plurality of traveling blow molds supported by said support structure, each said mold having means for opening and closing and each said mold positioned and configured to close around the hollow tube after it passes through said heater means to enclose a segment thereof, each said mold also having means for stretching a tube segment up to 2.5 times its length prior to blow molding to provide axial orientation and each said mold also positioned and configured to travel longitudinally away from said heater means in a closed position at a rate substantially equal to the rate of extrusion of the hollow tube, to inject blow gas into the hollow tube as said mold travels away from said heater means to form the desired article, to open and release the blown article, and to travel longitudinally toward said heater means in an open position.

28. The apparatus as recited in claim 25, 26 or 27 wherein said blow molds are operated at a temperature between about 32° F. and about 60° F.

29. The apparatus as recited in claim 25, 26 or 27 wherein said die head includes means for controlling the wall thickness of the extruded hollow tube.

30. The apparatus as recited in claim 25, 26 or 27 wherein each said traveling blow mold is a multicavity mold for forming a plurality of polyethylene terephthalate articles simultaneously.

31. The apparatus as recited in claim 25, 26 or 27 wherein each said traveling blow mold is configured to mold articles with integral handles.

32. The apparatus as recited in claim 25, 26 or 27 wherein said shear energy imparting means comprises a relatively small spacing between flights on said extrusion screw and an inside wall of said barrel, and a plurality of lugs on said tapered tip of said extrusion screw.

33. An apparatus for extrusion blow molding circumferentially oriented, heat set, monolayer polyethylene terephthalate articles, comprising:

(a) an extruder for extruding monolayer polyethylene terephthalate as a hollow tube, said extruder having a barrel with an input opening and an output opening, an extrusion screw disposed within said barrel, means for rotating said screw, a die head attached to said barrel at an end adjacent said output opening, and a plurality of extruder heating means for independently heating a plurality of zones of said barrel and die head to predetermined temperatures which in turn heat the polyethylene terephthalate to predetermined temperatures as it passes from said input opening to said output opening and through said die head, said screw having a tapered tip at an end adjacent said die head;

(b) means for controlling said extruder and die head heating means to establish a reverse temperature gradient along the combined length of said extruder barrel and said die head beginning at a maximum temperature at the input end of said extruder in the approximate range of 520° F.-560° F. and ending at a minimum temperature at the output of said die head in the approximate range of 490° F.-520° F., to thereby increase the viscosity of the polyethylene terephthalate along the length of said extruder and establish a viscosity gradient-induced back pressure in said extruder barrel;

(c) means for imparting sufficient shear energy to the molten polyethylene terephthalate to render it substantially clear, homogeneous and free of non-melted pellets at the input to said die head;

(d) a structure adjacent said extruder for supporting adjacent first and second sets of traveling blow molds and means for oscillating said sets of blow molds longitudinally on said support structure along a path colinear with the extruded hollow tube, said molds supported such that each mold faces in a direction traverse the path of the extruded hollow tube and each mold faces in the opposite transverse direction of an adjacent mold; and (e) first and second sets of traveling blow molds supported adjacent one another by said support structure, each mold in said first set having means for opening and closing and each said mold positioned and configured to close around the hollow tube as it is extruded from said die head to enclose a segment thereof, to travel longitudinally away from said die head in a closed position at a rate substantially equal to the rate of extrusion of the hollow tube, to inject blow gas into the hollow tube as said mold travels away from said die head to form the desired article, to open and release the blown article, and to travel longitudinally toward said die head in an open position, each mold in said second set having means for opening and closing and each said mold positioned and configured to close around a blow article release from said first set of molds, to travel away from said die head in a closed position at a rate substantially equal to the rate of extrusion of the hollow tube, to inject blow gas into the enclosed, blown article as said mold travels away from said die head to heat set the article, to open and release the blown, heat set article, and to travel longitudinally toward said die head in an open position.

34. The apparatus as recited in claim 33 wherein the molds in said first set of blow molds are operated at a temperature above the glass transition temperature of polyethylene terephthalate and the molds in said second set of blow molds are operated at a temperature between about 32° F. and about 45° F.

35. An apparatus for extrusion blow molding circumferentially oriented, heat set, multilayer articles wherein at least one layer is polyethylene terephthalate, comprising:
  (a) a plurality of extruders each having an input opening and an output opening for extruding one component layer of a multilayer hollow tube, each said extruder having a barrel, an extrusion screw disposed within said barrel, and means for rotating said screw, at least one said extruder for extruding a polyethylene terephthalate layer of said multilayer hollow tube, said polyethylene terephthalate extruder having a plurality of extruder heating means for independently heating a plurality of zones of said barrel to predetermined temperatures which in turn heat the polyethylene terephthalate to predetermined temperatures as it passes from said input opening to said output opening, said polyethylene terephthalate extruder screw having a tapered tip at an end adjacent said output opening;
  (b) a die head attached to said barrels of said extruders at their output openings for forming a multilayer hollow tube, said die head having heating means for heating said multilayer hollow tube to a predetermined temperature;
  (c) means for controlling said extruder and die head heating means to establish a reverse temperature gradient along the combined length of said extruder barrel and said die head beginning at a maximum temperature at the input end of said extruder in the approximate range of 520° F.–560° F. and ending at a minimum temperature at the output of said die head in the approximate range of 490° F.–520° F., to thereby increase the viscosity of the polyethylene terephthalate along the length of said extruder and establish a viscosity gradient-induced back pressure in said extruder barrel;
  (d) means for imparting sufficient shear energy to the molten polyethylene terephthalate to render it substantially clear, homogenous and free of non-melted pellets at the input to said die head;
  (e) a structure adjacent said extruder for supporting adjacent first and second sets of traveling blow molds and means for oscillating said sets of blow molds longitudinally on said support structure along a path colinear with the extruded hollow tube, said mods supported such that each mold faces in a direction transverse the path of the extruded hollow tube and each mold faces in the opposite transverse direction of an adjacent mold; and
  (f) first and second sets of traveling blow molds supported adjacent one another by said support structure, each mold in said first set having means for opening and closing and each said mold positioned and configured to close around the hollow tube after it passes through said vacuum box and cooling means to enclose a segment thereof, to travel longitudinally away from said vacuum box in a closed position at a rate substantially equal to the rate of extrusion of the hollow tube, to inject blow gas into the hollow tube as said mold travels away from said vacuum box to form the desired article, to open and release the blown article, and to travel longitudinally toward said vacuum box in an open position, each mold in said second set having means for opening and closing and each said mold positioned and configured to close around a blown article released from said first set of molds, to travel away from said die head in a closed position at a rate substantially equal to the rate of extrusion of the hollow tube, to inject blow gas into the enclosed, blown article as said mold travels away from said die head to heat set the article, to open and release the blown, heat set article, and to travel longitudinally toward said die head in an open position.

36. The apparatus as recited in claim 35 wherein the molds in said first set of blow molds are operated at a temperature above the glass transition temperature of polyethylene terephthalate and the molds in said second set of blow molds are operated at a temperature between about 32° F. and about 45° F.

37. An apparatus for extrusion blow molding biaxially oriented, heat set, monolayer polyethylene terephthalate articles, comprising:
  (a) an extruder for extruding monolayer polyethylene terephthalate as a hollow tube, said extruder having a barrel with an input opening and an output opening, an extrusion screw disposed within said barrel, means for rotating said screw, a die head attached to said barrel at an end adjacent said output opening, and a plurality of extruder heating means for independently heating a plurality of zones of said barrel and die head to predetermined temperatures which in turn heat the polyethylene terephthalate to predetermined temperatures as it passes from said input opening to said output opening and through said die head, said screw having a tampered tip at an end adjacent said die head;
  (b) means for controlling said extruder and die head heating means to establish a reverse temperature gradient along the combined length of said extruder barrel and said die head beginning at a maximum temperature at the input end of said extruder in the approximate range of 520° F.–560° F. and ending at a minimum temperature at the output of said die head in the approximate range of 490° F.–520° F., to thereby increase the viscosity of the polyether terephthalate along the length of said extruder and establish a viscosity gradient-induced back pressure in said extruder barrel;

(c) means for imparting sufficient shear energy to the molten polyethylene terephthalate to render it substantially clear, homogeneous and free of non-melted pellets at the input to said die head;

(d) a structure adjacent said extruder for supporting adjacent first and second sets of traveling blow molds and means for oscillating said sets of blow molds longitudinally on said support structure along a path colinear with the extruded hollow tube, said molds supported such that each mold faces in a direction transverse the path of the extruded hollow tube and each mold faces in the opposite transverse direction of an adjacent mold; and (e) first and second sets of traveling blow molds supported adjacent one another by said support structure, each mold in said first set having means for opening and closing and each said mold positioned and configured to close around the hollow tube as it is extruded from said die head to enclose a segment thereof, each said mold also having means for stretching a tube segment up to 2.5 times its length prior to blow molding to provide axial orientation and each said mold also positioned and configured to travel longitudinally away from said die head in a closed position at a rate substantially equal to the rate of extrusion of the hollow tube, to inject blow gas into the hollow tube as said mold travels away from said die head to form the desired article, to open and release the blown article, and to travel longitudinally toward said die head in an open position, each mold in said second set having means for opening and closing and each said mold positioned and configured to close around a blown article released from said first set of molds, to travel away from said die head in a closed position at a rate substantially equal to the rate of extrusion of the hollow tube, to inject blow gas into the enclosed, blown article as said mold travels away from said die head to heat set the article, to open and release the blown, heat set article, and to travel longitudinally toward said die head in an open position.

38. The apparatus as recited in claim 37 wherein the molds in said first set of blow molds are operated at a temperature above the glass transition temperature of polyethylene terephthalate and the molds in said second set of blow molds are operated a at temperature between about 32° F. and about 45° F.

39. An apparatus for extrusion blow molding biaxially oriented, heat set, multilayer articles wherein at least one layer is polyethylene terephthalate, comprising:

(a) a plurality of extruders each having an input opening and an output opening for extruding one component layer of a multilayer hollow tube, each said extruder having a barrel, an extrusion screw disposed within said barrel, and means for rotating said screw, at least one said extruder for extruding a polyethylene terephthalate layer of said multilayer hollow tube, said polyethylene terephthalate extruder having a plurality of extruder heating means for independently heating a plurality of zones of said barrel to predetermined temperatures which in turn heat the polyethylene terephthalate to predetermined temperatures as it passes from said input opening to said output opening, said polyethylene terephthalate extruder screw having a tapered tip at an end adjacent said output opening;

(b) a die head attached to said barrels of said extruders at their output openings for forming a multilayer hollow tube, said die head having heating means for heating said multilayer hollow tube to a predetermined temperature;

(c) means for controlling said extruder and die head heating means to establish a reverse temperature gradient along the combined length of said extruder barrel and said die head beginning at a maximum temperature at the input end of said extruder in the approximate range of 520° F.–560° F. and ending at a minimum temperature at the output of said die head in the approximate range of 490° F.–520° F., to thereby increase the viscosity of the polyethylene terephthalate along the length of said extruder and establish a viscosity gradient-induced back pressure in said extruder barrel;

(d) means for imparting sufficient shear energy to the molten polyethylene terephthalate to render it substantially clear, homogenous and free of non-melted pellets at the input to said die head;

(e) a structure adjacent said extruder for supporting adjacent first and second sets of traveling blow molds and means for oscillating said sets of blow molds longitudinally on said support structure along a path colinear with the extruded hollow tube, said molds supported such that each mold faces in a direction transverse the path of the extruded hollow tube and each mold faces in the opposite transverse direction of an adjacent mold; and (f) first and second sets of traveling blow molds supported adjacent one another by said support structure, each mold in said first set having means for opening and closing and each said mold positioned and configured to close around the hollow tube as it is extruded from said die head to enclose a segment thereof, each said mold also having means for stretching a tube segment up to 2.5 times its length prior to blow molding to provide axial orientation and each said mold also positioned and configured to travel longitudinally away from said die head in a closed position at a rate substantially equal to the rate of extrusion of the hollow tube, to inject blow gas into the hollow tube as said mold travels away from said die head to form the desired article, to open and release the blown article, and to travel longitudinally toward said die head in an open position, each mold in said second set having means for opening and closing and each said mold positioned and configured to close around a blown article released from said first set of molds to travel away from said die head in a closed position at a rate substantially equal to the rate of extrusion of the hollow tube, to inject blow gas into the enclosed, blown article as said mold travels away from said die head to heat set the article, to open and release the blown, heat set article, and to travel longitudinally toward said die head in an open position.

40. The apparatus as recited in claim 39 wherein the molds in said first set of blow molds are operated at a temperature above the glass transition temperature of polyethylene terephthalate and the molds in said second set of blow molds are operated at a temperature between about 32° F. and about 45° F.

41. The apparatus as recited in claim 33, 35, 37 or 39 wherein said shear energy imparting means comprises a relatively small spacing between flights on said extrusion screw and an inside wall of said barrel, and a plurality of lugs on said tapered tip of said extrusion screw.

* * * * *

UNITED STATES PATENT AND TRADEMARK OFFICE
CERTIFICATE OF CORRECTION

PATENT NO. : 4,988,279

DATED : January 29, 1991

INVENTOR(S) : Samuel L. Belcher

It is certified that error appears in the above-identified patent and that said Letters Patent is hereby corrected as shown below:

Column 2, line 20, after "produced" insert --by the process of extruding a soft tube of PET--

Column 4, line 42, "95°F" should be --195°F--

Column 11, line 65, "biaxailly" should be --biaxially--

Column 13, line 41, "520°F" should not be in bold letters.

Column 13, line 38, "520" should not be in bold letters.

Column 14, line 1, "longitudinal" should be --longitudinally--

Column 18, line 53, "ib" should be --it--

Column 20, line 11, after "tube" insert --said molds supported such that each mold faces in a direction--

Column 22, line 34, "i" should be --in--

Column 23, line 23, "mans" should be --means--

Column 23, line 56, after "output" insert --opening--

Column 24, line 55, "blow" should be --blown--

UNITED STATES PATENT AND TRADEMARK OFFICE
CERTIFICATE OF CORRECTION

PATENT NO. : 4,988,279

DATED : January 29, 1991

INVENTOR(S) : Samuel L. Belcher

It is certified that error appears in the above-identified patent and that said Letters Patent is hereby corrected as shown below:

Column 25, line 32, "tubes" should be --tube--

Column 27, line 10, "blow" should be --blown--

Column 27, line 10, "release" should be --released--

Column 28, line 4, "mods" should be --molds--

Column 28, line 68, "polyether" should be --polyethylene--

Signed and Sealed this

Fifth Day of January, 1993

Attest:

DOUGLAS B. COMER

Attesting Officer

Acting Commissioner of Patents and Trademarks